United States Patent
Ueda

(10) Patent No.: US 9,461,734 B2
(45) Date of Patent: Oct. 4, 2016

(54) COMMUNICATION SYSTEM, BASE STATION APPARATUS, DATA TRANSMISSION METHOD AND NON-TRANSITORY COMPUTER READABLE MEDIUM STORING PROGRAM

(75) Inventor: Yoshio Ueda, Tokyo (JP)

(73) Assignee: NEC CORPORATION, Tokyo (JP)

(*) Notice: Subject to any disclaimer, the term of this patent is extended or adjusted under 35 U.S.C. 154(b) by 81 days.

(21) Appl. No.: 14/356,580

(22) PCT Filed: Aug. 1, 2012

(86) PCT No.: PCT/JP2012/004882
§ 371 (c)(1),
(2), (4) Date: May 6, 2014

(87) PCT Pub. No.: WO2013/073077
PCT Pub. Date: May 23, 2013

(65) Prior Publication Data
US 2014/0301277 A1    Oct. 9, 2014

(30) Foreign Application Priority Data

Nov. 17, 2011    (JP) .................................. 2011-251454

(51) Int. Cl.
| | |
|---|---|
| H04W 4/00 | (2009.01) |
| H04B 7/26 | (2006.01) |
| H04W 24/02 | (2009.01) |
| H04W 84/18 | (2009.01) |

(52) U.S. Cl.
CPC ............... *H04B 7/26* (2013.01); *H04W 24/02* (2013.01); *H04W 84/18* (2013.01)

(58) Field of Classification Search
USPC .................. 370/315–329, 232–254, 331; 455/426–445
See application file for complete search history.

(56) References Cited

U.S. PATENT DOCUMENTS

| | | | | |
|---|---|---|---|---|
| 8,467,351 B2* | 6/2013 | Liu | ................... | H04W 36/0094 370/332 |
| 8,520,636 B2* | 8/2013 | Xu | ......................... | H04L 63/061 370/331 |
| 8,537,855 B2* | 9/2013 | Wieslawa | ............... | H04W 4/18 370/236.1 |
| 8,606,324 B2* | 12/2013 | Murasawa | .............. | H04W 8/26 455/453 |
| 8,615,241 B2* | 12/2013 | Gupta | ............... | H04W 36/0011 455/437 |

(Continued)

FOREIGN PATENT DOCUMENTS

| | | |
|---|---|---|
| EP | 2 410 695 A1 | 1/2012 |
| JP | 2011-514783 A | 5/2011 |

OTHER PUBLICATIONS

International Search Report (ISR) (PCT Form PCT/ISA/210), in PCT/JP2012/004882, dated Sep. 25, 2012.

(Continued)

*Primary Examiner* — Man Phan
(74) *Attorney, Agent, or Firm* — McGinn IP Law Group, PLLC

(57) ABSTRACT

A communication system, (a base station apparatus, a data transmission method, and a program) in which unnecessary signalings do not occur in a large quantity as a result of the execution of a SON function, includes an eNB and an eNB that performs data transmission/reception with the eNB, in which the eNB includes a signal transmission/reception unit that transmits information to the eNB, the information being used to determine whether or not autonomous setting information should be transmitted from the eNB to the eNB.

15 Claims, 22 Drawing Sheets

(56) References Cited

U.S. PATENT DOCUMENTS

| | | | | |
|---|---|---|---|---|
| 9,002,361 | B2* | 4/2015 | Bergquist | H04W 12/08 370/331 |
| 9,049,627 | B2* | 6/2015 | Teyeb | H04W 36/0061 |
| 2009/0129291 | A1 | 5/2009 | Gupta et al. | |
| 2009/0227277 | A1 | 9/2009 | Gupta et al. | |
| 2010/0227603 | A1 | 9/2010 | Gupta et al. | |
| 2012/0263096 | A1* | 10/2012 | Masini | H04W 36/10 370/315 |
| 2013/0072201 | A1* | 3/2013 | Nakamura | H04W 16/08 455/445 |
| 2013/0230014 | A1* | 9/2013 | Kitaji | H04W 28/08 370/329 |

OTHER PUBLICATIONS

3GPP TS 36.300 V10.5.0 "E-UTRA and E-UTRAN Overall description Stage 2" Sep. 2011.

3GPP TS 32.101 V10.0.0 "Telecommunication management; Principles and high level requirements (Release 10)" Sep. 2010.

3GPP TS 32.500 V10.1.0 "Telecommunication management; Self-Organizing Networks (SON); Concepts and requirements (Release 10)" Sep. 2010.

3GPP TR 36.902 V9.3.1 "E-UTRAN; Self-configuring and self-optimizing network (SON) use cases and solutions (Release 9)" Mar. 2011.

3GPP TS 32.541 V10.0.0 "Telecommunication management; Self-Organizing Networks (SON); Self-healing concepts and requirements (Release 10)" Mar. 2011.

3GPP TS 36.423 V10.3.0 "E-UTRAN X2 application protocol (X2AP) (Release 10)" Sep. 2011.

Self-Optimizing Networks: The Benefits of SON in LTE, Jun. 2011, p. 7-12, 15-17, 20, 21, 24, 32, 33, 38, 39, 42, 47 [Retrieved on Sep. 13, 2012]. Retrieved from the Internet: <URL:http://www.4gamericas.org/documents/Self-Optimizing%20Networks-Benefits%20of%20SON%20in%20LTE-July%202011.pdf>.

Extended European Search Report dated Jul. 27, 2015.

NEC "Load Balancing Signalling and associated SON" 3GPP Draft; R2-081175, 3$^{rd}$ Generation Partnership Project (3GPP), Mobile Competence Centre; 650; Route Des Lucioles; F-06921 Sophia-Antipolis Cedex; France, vol. RAN WG2, No. Sorrento, Italy; Feb. 5, 2008, XP050138949, [retrieved on Feb. 5, 2008].

NEC "Load Balancing procedure for X2 interface" 3GPP Draft; R3-081403, 3$^{rd}$ Generation Partnership Project (3GPP), Mobile Competence Centre; 650; Route des Lucioles; F-06921 Sophia-Antipolis Cedex; France, vol. RAN WG3, No. Kansas City, USA, Apr. 30, 2008, XP050164575, [retrieved on Apr. 30, 2008].

NEC "SON Negotiation procedure" 3GPP Draft; R3-092370, 3$^{rd}$ Generation Partnership Project (3GPP), Mobile Competence Centre; 650, Route Des Lucioles; F-06921 Sophia-Antipolis Cedex; France, No. Miyazaki; Oct. 12, 2009, XP050391887, [retrieved on Oct. 3, 2009].

\* cited by examiner

Fig. 2

9.1.2.3 X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| SON Solution Information | — | | | | | |
| Served Cells | M | 1 to maxCellineNB | | Complete list of cells served by the eNB | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0..503,...) | Physical Cell Identifier of the neighbour cell | — | — |
| >>EARFCN | M | | 9.2.26 | DL EARFCN for FDD and EARFCN for TDD | — | — |
| ... | | | | | | |

9.1.2.4 X2 SETUP RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| SON Solution Information | — | | | | | |
| Served Cells | | 1 to maxCellineNB | | Complete list of cells served by the eNB | YES | reject |
| >Served Cell Information | M | | 9.2.8 | | — | — |
| >Neighbour Information | | 0 to maxnoofNeighbours | | | — | — |
| >>ECGI | M | | ECGI 9.2.14 | E-UTRAN Cell Global Identifier of the neighbour cell | — | — |
| >>PCI | M | | INTEGER (0..503,...) | Physical Cell Identifier of the neighbour cell | — | — |
| >>EARFCN | M | | 9.2.26 | DL EARFCN for FDD and EARFCN for TDD | — | — |
| . . . | | | | | | |

| IE/Group Name | Presence | Range | IE type and reference | Semantics description | Criticality | Assigned Criticality |
|---|---|---|---|---|---|---|
| SON Solution type for PCI Assignment | O | | ENUMERATED(Distributed, Hybrid, Centralised, None, ...) | | YES | ignore |
| Identification of Node executing PCI Assignment algorithm | C- Centralised or Hybrid | | IP Address OR FQDN | IP ADDRESS OF SON IMPLEMENTING NODE OR FQDN | YES | ignore |
| SON Solution type for ANR Algorithm | O | | ENUMERATED(Distributed, Hybrid, Centralised, None, ...) | | YES | ignore |
| Identification of Node executing ANR algorithm | C- Centralised or Hybrid | | IP Address OR FQDN | IP ADDRESS OF SON IMPLEMENTING NODE OR FQDN | YES | ignore |
| SON Solution type for MRO Algorithm | O | | ENUMERATED(Distributed, Hybrid, Centralised, None, ...) | | YES | ignore |
| Identification of Node executing MRO algorithm | C- Centralised or Hybrid | | IP Address OR FQDN | IP ADDRESS OF SON IMPLEMENTING NODE OR FQDN | YES | ignore |
| SON Solution type for MLB Algorithm | O | | ENUMERATED(Distributed, Hybrid, Centralised, None, ...) | | YES | ignore |
| Identification of Node executing MLB algorithm | C- Centralised or Hybrid | | IP Address OR FQDN | IP ADDRESS OF SON IMPLEMENTING NODE OR FQDN | YES | ignore |

Fig. 4B

| IE/Group Name | Presence | Range | IE type and reference | Semantics description | Criticality | Assigned Criticality |
|---|---|---|---|---|---|---|
| SON Solution type for CCO Algorithm | O | | ENUMERATED(Distributed, Hybrid, Centralised, None, ...) | | YES | ignore |
| Identification of Node executing CCO algorithm | C- Centralised or Hybrid | | IP Address OR FQDN | IP ADDRESS OF SON IMPLEMENTING NODE OR FQDN | YES | ignore |
| SON Solution type for Energy Saving Algorithm | O | | ENUMERATED(Distributed, Hybrid, Centralised, None, ...) | | YES | ignore |
| Identification of Node executing Energy Saving algorithm | C- Centralised or Hybrid | | IP Address OR FQDN | IP ADDRESS OF SON IMPLEMENTING NODE OR FQDN | YES | ignore |
| SON Solution type for ICIC Algorithm | O | | ENUMERATED(Distributed, Hybrid, Centralised, None, ...) | | YES | ignore |
| Identification of Node executing ICIC algorithm | C- Centralised or Hybrid | | IP Address OR FQDN | IP ADDRESS OF SON IMPLEMENTING NODE OR FQDN | YES | ignore |
| SON Solution type for CoC Algorithm | O | | ENUMERATED(Distributed, Hybrid, Centralised, None, ...) | | YES | ignore |
| Identification of Node executing CoC algorithm | C- Centralised or Hybrid | | IP Address OR FQDN | IP ADDRESS OF SON IMPLEMENTING NODE OR FQDN | YES | ignore |

| Condition | Explanation |
|---|---|
| Centralised or Hybrid | This IE shall be present if the SON Solution Type IE is set to the "Centralised" or "Hybrid", Identification of Node(e.g. IP Address or FQDN) is present. |

9.2.8 Served Cell Information

| IE/Group Name | Presence | Range | IE type and reference | Semantics description | Criticality | Assigned Criticality |
|---|---|---|---|---|---|---|
| PCI | M | | INTEGER (0..503, ...) | Physical Cell ID | — | — |
| Cell ID | M | | ECGI 9.2.14 | | — | — |
| TAC | M | | OCTET STRING(2) | Tracking Area Code | — | — |
| SON Solution Information | | | | | | |
| Broadcast PLMNs | | 1..<maxnoofBPLMNs> | | Broadcast PLMNs | — | — |
| >PLMN Identity | M | | 9.2.4 | | — | — |
| CHOICE EUTRA-Mode-Info | M | | | | — | — |
| >FDD | | 1 | | | | |
| >>FDD Info | | | | | — | — |
| >>>UL EARFCN | M | | EARFCN 9.9.26 | Corresponds to $N_{UL}$ in ref. TS 36.104 [16] | — | — |
| >>>DL EARFCN | M | | EARFCN 9.2.26 | Corresponds to $N_{DL}$ in ref. TS 36.104 [16] | — | — |
| ... | | | | | | |

Fig. 5

9.1.2.8 ENB CONFIGURATION UPDATE

| IE/Group Name | Presence | Range | IE type and reference | Semantics description | Criticality | Assigned Criticality |
|---|---|---|---|---|---|---|
| Message Type | M | | 9.2.13 | | YES | reject |
| SON Solution Information | O | | | | | |
| Served Cells To Add | | 0 to maxCellineNB | | Complete list of added cells served by the eNB | GLOBAL | reject |
| >Served Cell Information | M | | 9.2.8 | | – | – |
| >Neighbour Information | | 0 to maxnoofNeighbours | | | – | – |
| >>ECGI | M | | ECGI 9.2.14 | E-UTRAN Cell Global Identifier of the neighbour cell | – | – |
| >>PCI | M | | INTEGER (0..503,...) | Physical Cell Identifier of the neighbour cell | – | – |
| >>EARFCN | M | | 9.2.26 | DL EARFCN for FDD and EARFCN for TDD | – | – |
| ... | | | | | | |

Fig. 6

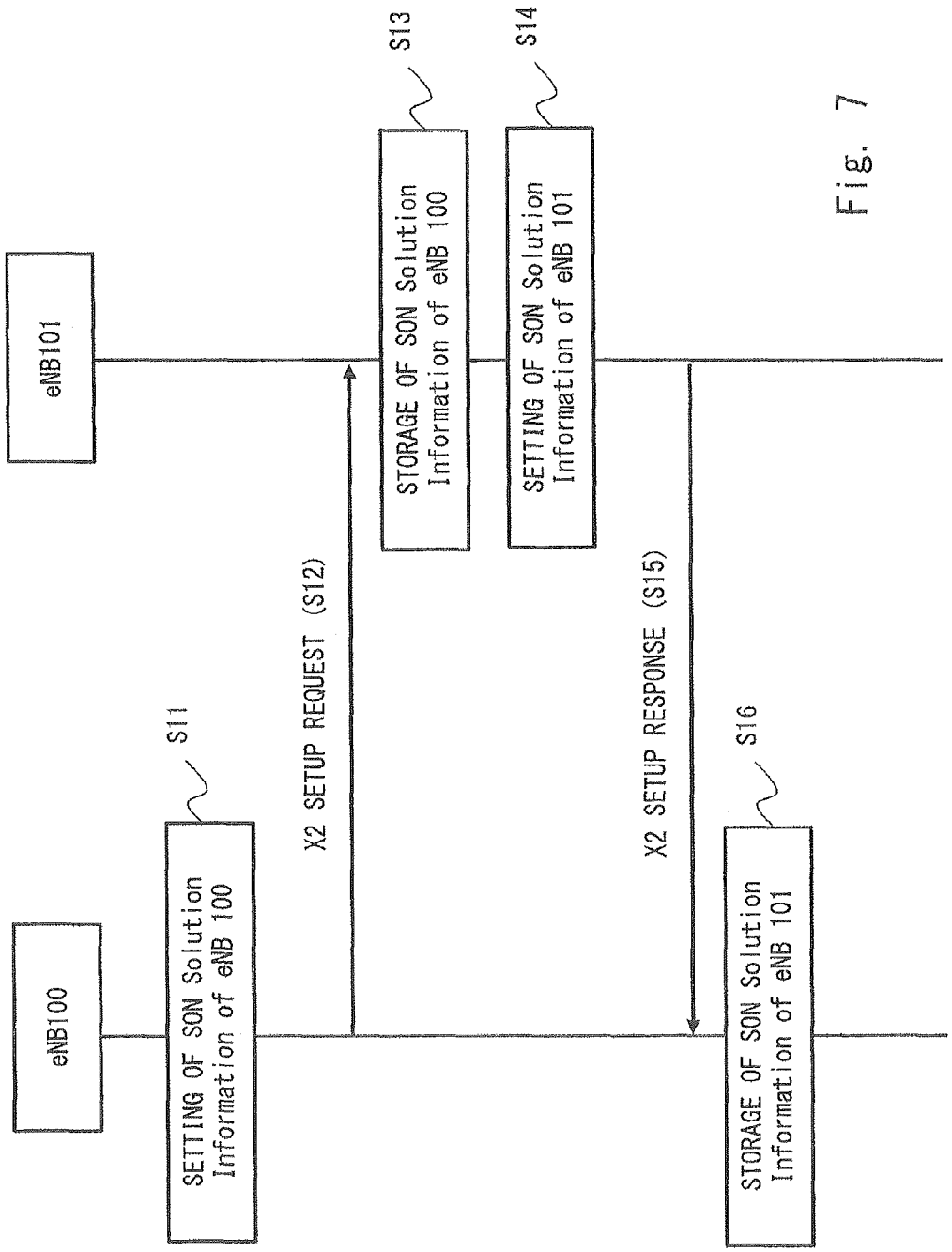

| eNB NUMBER | SUPPORT STATUS OF PCI OPTIMIZATION | Solution type OF PCI OPTIMIZATION | NODE IDENTIFIER OF PCI OPTIMIZATION | MRO SUPPORT STATUS | MRO Solution type | MRO NODE IDENTIFIER |
|---|---|---|---|---|---|---|
| 101 | SUPPORTED | Distributed | N/A | SUPPORTED | Hybrid | EM201 |
| 102 | SUPPORTED | Centralised | EM200 | NOT SUPPORTED | N/A | N/A |
| 103 | SUPPORTED | Distributed | N/A | SUPPORTED | Hybrid | EM201 |
| 104 | SUPPORTED | Centralised | EM200 | SUPPORTED | Centralised | EM200 |
| 105 | SUPPORTED | Distributed | N/A | NOT SUPPORTED | N/A | N/A |
| 106 | SUPPORTED | Distributed | N/A | SUPPORTED | Distributed | N/A |

6.3.9.2 Attributes

| Attribute name | Support Qualifier | Read Qualifier | Write Qualifier |
|---|---|---|---|
| Id | M | M | - |
| tCI | O | M | M |
| isRemoveAllowed | CM | M | M |
| isHOAllowed | CM | M | M |
| adjacentCell | M | M | M |
| isICICInformationSendAllowed | CM | M | M |
| isLBAllowed | CM | M | M |
| isESCoveredBy | CM | M | M |
| SON Solution type for PCI Assignment | O | M | M |
| Identification of Node executing PCI Assignment algorithm | O | M | M |
| SON Solution type for ANR Algorithm | O | M | M |
| Identification of Node executing ANR algorithm | O | M | M |
| SON Solution type for MRO Algorithm | O | M | M |
| Identification of Node executing MRO algorithm | O | M | M |
| SON Solution type for MLB Algorithm | O | M | M |
| Identification of Node executing MLB algorithm | O | M | M |
| SON Solution type for CCO Algorithm | O | M | M |
| Identification of Node executing CCO algorithm | O | M | M |
| SON Solution type for Energy Saving Algorithm | O | M | M |
| Identification of Node executing Energy Saving algorithm | O | M | M |
| SON Solution type for ICIC Algorithm | O | M | M |
| Identification of Node executing ICIC algorithm | O | M | M |
| SON Solution type for CoC Algorithm | O | M | M |
| Identification of Node executing CoC algorithm | O | M | M |

Fig. 15

9.1.2.3 X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Prohibited X2AP procedure | | 1 | | | Yes | ignore |
| >Load Indication | — | | | | | |
| >Resource Status Reporting | — | | | | | |
| >eNB Configuration Update | — | | | | | |
| >Mobility Setting Change | — | | | | | |
| >Handover Report | — | | | | | |
| ... | | | | | | |

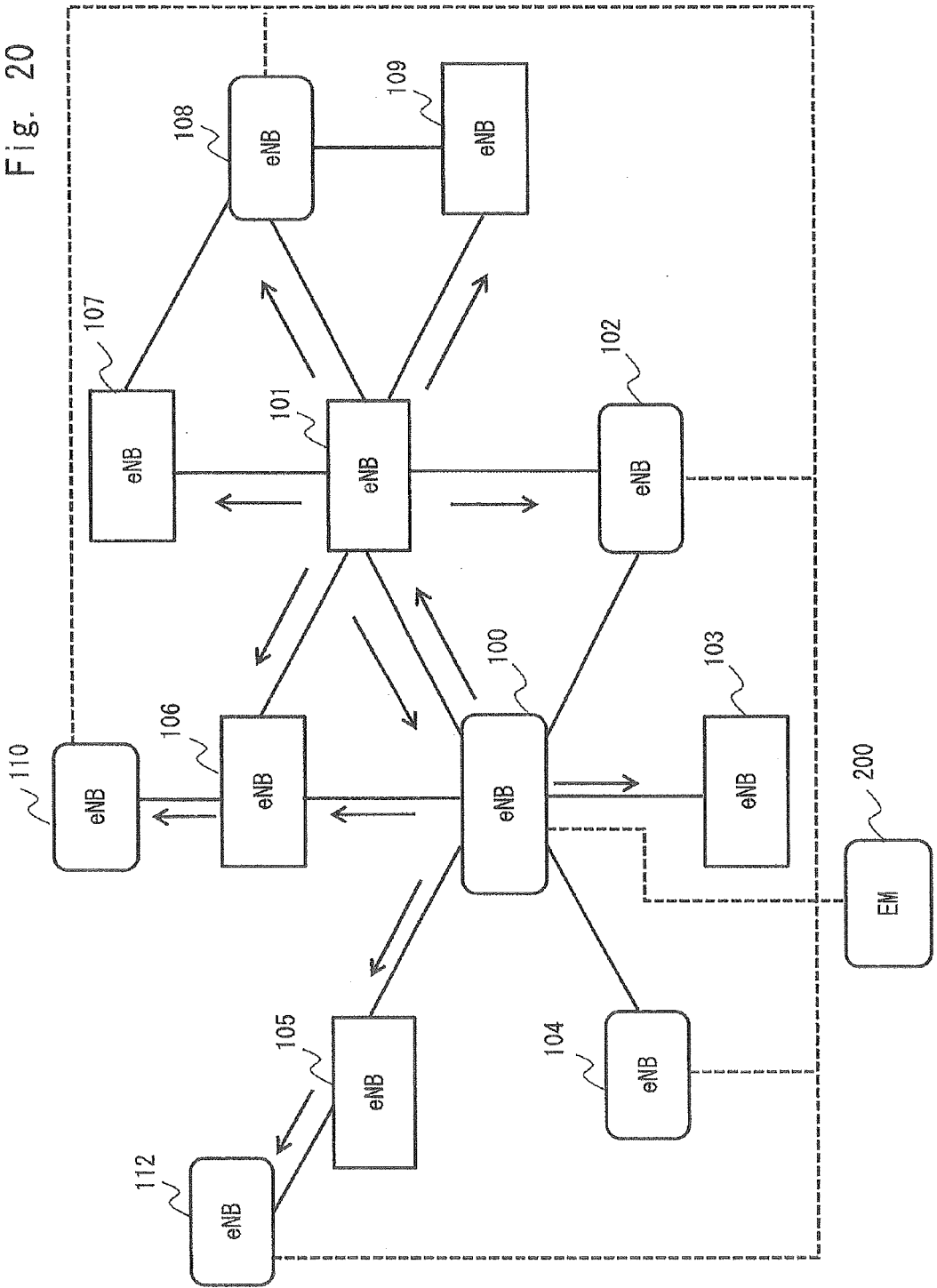

| Function | X2AP Elementary Procedure(s) | SON USE CASE |
|---|---|---|
| Mobility Management | a) Handover Preparation<br><br>b) SN Status Transfer<br><br>c) UE Context Release<br><br>d) Handover Cancel | |
| Load Management | a) Load Indication | ICIC |
| | b) Resource Status Reporting Initiation<br><br>c) Resource Status Reporting | MLB |
| Reporting of General Error Situations | Error Indication | |
| Resetting the X2 | Reset | |
| Setting up the X2 | X2 Setup | PCI, ANR |
| eNB Configuration Update | a) eNB Configuration Update<br><br>b) Cell Activation | PCI, ANR |
| Mobility Parameters Management | Mobility Settings Change | MRO, MLB |
| Mobility Robustness Optimisation | a) Radio Link Failure Indication<br><br>b) Handover Report | MRO |
| Energy Saving | a) eNB Configuration Update<br><br>b) Cell Activation | Energy Saving |

Fig. 21

COMMUNICATION SYSTEM, BASE STATION APPARATUS, DATA TRANSMISSION METHOD AND NON-TRANSITORY COMPUTER READABLE MEDIUM STORING PROGRAM

TECHNICAL FIELD

The present invention relates to a communication system including a base station apparatus that autonomously performs apparatus setting.

BACKGROUND ART

When setting is performed on a base station included in a mobile communication network, an SON (Self Organizing Networks) function for collecting and analyzing quality measurement data and the like from a terminal(s) and a base station(s) and autonomously performing the apparatus setting is used. By using the SON function, it is possible to improve the quality of the network and reduce the operation cost.

For example, an operation performed by an HNB (Home NodeB) or an HeNB (Home eNodeB), which is a home-use compact base station, in which the HNB (Home NodeB) or the HeNB (Home eNodeB) itself automatically performs Plug-and-Play, receives a radio wave (network listening), and determines a radio parameter(s) such as a frequency (EARFCN: E-UTRA Absolute Radio Frequency Channel Number) and a PCI (Physical Cell ID) is considered to be one of the SON operations. Further, an operation in which the status of a radio wave (such as a distribution of pilot channels, a neighboring cell(s), interference, a throughput status, a handover failure rate, a radio load status, and PM (Performance Management)) is measured over a long period, and an OAM parameter(s) is thereby optimized by a statistical technique is also considered to be one of the SON operations.

A configuration of a mobile communication system compliant with an LTE radio communication scheme is explained with reference to FIG. 16. An eNB 10, an eNB 11, and an eNB 12 are base stations compliant with the LTE radio communication scheme. An interface between eNBs is called "X2-interface" (see Non-patent literature 1: 3G3GPP TS36.300). An EM 14 is an Element Manager that controls the eNBs, and an NM 15 is a higher-level apparatus of the EM 14 on the OAM, and represents a Network Manager that maintains and monitors the entire network. An MME/S-GW 13 represents a core network, and performs movement management control and session management control. The interface between an eNB and the MME/S-GW is defined as "S1-interface".

Next, an OAM reference model disclosed in Non-patent literature 2 (3GPP TS32.101) is explained with reference to FIG. 17. In this figure, respective definitions for an NM (Network Manager), an EM (Element Manager), and an NE (Network Element) are based on 3GPP TS32.101.

NEs 21 to 25 are Network Elements. For example, an eNB (E-UTRAN NodeB), an HeNB, a NodeB, an RNC, and an HNB (Home NodeB) correspond to these elements. DMs 31 to 33 are Domain Managers, and hold a Network Element management function and a sub-network domain management function. EMs 34 to 37 are Element Managers, and provide a Network Element management function. NMs 41 and 42 are Network Managers and are located on a higher level of the EMs. The NMs 41 and 42 manages a network supported by the EMs. When an EM function is accommodated in an NE, the NE is directly accessed by the NM. The NMs 41 and 42 are connected to Enterprise Systems 50 formed by a server apparatus and so on.

Among others, the interface between an EM and an NM or between an NE having an EM function and an NM is defined as a "Type-2 interface". It is also defined as an "ITF-N (North bound interface)", which is an open interface defined in the 3GPP standardization specifications series.

Next, an SON solution implemented in the above-described OAM reference model will be explained. In the SON solution, there are three methods, i.e., a Centralised SON, a Distributed SON, and a Hybrid SON as mentioned in Non-patent literature 3 (3GPP TS32.500 Ver10.1.0). The Centralised SON is an SON solution in which an SON algorithm is implemented in an OAM system. There are two types of the Centralised SON, i.e., an NM-Centralised SON in which an SON algorithm is implemented in a Network Management level and an EM-Centralised SON in which an SON algorithm is implemented in an Element Management level. The Distributed SON is an SON solution in which an SON algorithm is implemented in a Network Element level. Further, the Hybrid SON is an SON solution in which an SON algorithm is implemented in a plurality of levels including an NE, or an EM and an NM.

These SON solutions are appropriately selected according to the details of the automatic setting, the OAM target apparatus to be automatically optimized, the SON algorithm, or the required performance. Further, the SON solution is implemented in a vendor apparatus, i.e., a communication apparatus.

In the case of the Distributed SON, since the SON algorithm is implemented in an NE, the OAM parameters can be immediately changed. Therefore, the Distributed SON is suitable to optimize the OAM parameters in real-time. However, in order for the NE itself to optimize the OAM parameters, the NE needs to frequently collect information from neighboring NEs by using protocol messages. Therefore, when the Distributed SON is performed, the number of signalings between NEs increases. Further, there is a restriction that the range the NE can recognize is limited to cells adjacent to the NE or to the range of cells which such adjacent cells are adjacent to.

In contrast, in the Centralised SON, a plurality of NEs in a wide range can be collectively managed in a centralized manner and their statistical information can be used. Therefore, the Centralised SON is suitable to optimize the entire network at long intervals. Further, there is a merit that there is no need to use signaling such as an X2AP-message between NEs.

In a network, there is a possibility that a plurality of vendor apparatuses (such as NEs, EMs, and NMs) are used and a different SON solution is used for each apparatus by using an algorithm (SON algorithm) or an SON performing method unique to the vendor.

For example, as mentioned in Non-patent literature 4 (TR36.902), as a PCI assignment optimization method, it is necessary to assign PCIs so that PCI Collision-free and PCI Confusion-free are guaranteed. However, whether the PCI assignment method should be implemented by the Distributed SON, the Centralised SON, or the Hybrid SON is dependent on the implementation of the apparatus vendor. That is, when the PCI assignment optimization algorithm is implemented on the NE side, it is implemented by the Distributed SON. Further, when the PCI assignment optimization algorithm is implemented in the EM or the NM, it is implemented by the Centralised SON. Further, when the PCI assignment optimization algorithm is implemented in both the NE and the EM/NM, it is implemented by the Hybrid SON. As described above, how it is implemented is dependent on the vendor implementation.

As typical use cases of the SON (SON functions), PCI assignment optimization, ANR (Automatic Neighbour Relation), MRO (Mobility Robustness Optimisation), MLB (Mobility Load Balancing), RACH Optimisation, Self Healing, ICIC (Inter-cell Interference Coordination), CoC (Cell outage Compensation) and so on are defined in 3GPP specifications (3GPP TS36.300 Ver10.0.0, TR36.902 V9.3.1, TS32.500 Ver10.0.0, Non-patent literature 5: TS32.541 Ver10.0.0 and so on).

Further, as defined in TR36.902, the PCI Collision-free is to guarantee that PCIs are unique in an area covered by a cell. Further, the PCI confusion-free is to guarantee that PCIs are unique in neighboring cells.

CITATION LIST

Non Patent Literature

Non-Patent literature 1: 3GPP TS 36.300 V10.5.0 "E-UTRA and E-UTRAN Overall description Stage 2" September 2011

Non-Patent literature 2: 3GPP TS 32.101 V10.0.0 "Telecommunication management; Principles and high level requirements (Release 10)" September 2010

Non-Patent literature 3: 3GPP TS 32.500 V10.1.0 "Telecommunication management; Self-Organizing Networks (SON); Concepts and requirements (Release 10)" September 2010

Non-Patent literature 4: 3GPP TR 36.902 V9.3.1 "E-UTRAN; Self-configuring and self-optimizing network (SON) use cases and solutions (Release 9)" March 2011

Non-Patent literature 5: 3GPP TS 32.541 V10.0.0 "Telecommunication management; Self-Organizing Networks (SON); Self-healing concepts and requirements (Release 10)" March 2011

Non-Patent literature 6: 3GPP TS 36.423 V10.3.0 "E-UTRAN X2 application protocol (X2AP) (Release 10)" September 2011

SUMMARY OF INVENTION

Technical Problem

When the Distributed SON and the Centralised SON are allowed to be used among multiple vendors in a mixed manner, the below-explained problems occur. The problems are explained based on an LTE system, with particular emphasis on an SON system using an eNodeB(s).

A first problem is explained hereinafter. In an X2-interface, various protocols are defined for the purpose of the SON. However, information on how a neighboring eNodeB(s) is implementing an SON is not sent by using an X2AP-message. Therefore, the eNodeB has to send information about the SON function by using an X2AP-message at all times irrespective of whether the Centralised SON is implemented or the Distributed SON is implemented in the neighboring eNodeB(s). As a result, there is a problem that even when the neighboring eNodeB(s) adopts the Centralised SON, the X2AP-messages cannot be reduced.

For example, in an X2AP (Non-patent literature 6: 3GPP TS36.423) procedure, eNBs can send neighboring "Neighbour relation" information to each other by using:
X2 SETUP; and
ENB CONFIGURATION UPDATE.

For example, in the X2 SETUP procedure, an eNB can send not only cell information (Served Cell Information) managed by the eNB itself but also neighboring cell information (Neighbour Information) when an X2 is established. Further, in the X2AP ENB CONFIGURATION UPDATE procedure, an eNB can send not only the newest cell information (added cell information, deleted cell information, and corrected cell information) managed by the eNB itself but also neighboring cell information. The neighboring cell information includes an ECGI (E-UTRAN Cell Global Identifier), a PCI (Physical Cell Identifier), an EARFCN and so on. For example, an eNB can recognize not only the PCI (Physical Cell Identifier) of a neighboring cell(s) but also the PCI information of an eNB(s) of a cell(s) adjacent to the neighboring cell(s).

The PCI information is an important parameter when an UE identifies a cell. In the LTE, the maximum number of PCIs that can be assigned is 504. Therefore, in the system, PCIs need to be repeatedly used. The PCI is an ID that is necessary to generate signaling necessary for a Cell search operation of an UE and for synchronous detection, and is one of the most important IDs among the IDs used in eNBs. In a radio system, if an optimal value is not used for the PCI, a handover failure caused by incorrect handover routing to a Target eNB due to the occurrence of PCI confusion could occur. Further, because of the increase of interference due to the occurrence of PCI collision, a decrease of throughput, synchronization loss, and so on could occur due to the deterioration of channel estimation performance in UEs. As a result, the quality of service to be provided to end users could deteriorate. As described above, to avoid the PCI Collision and the PCI Confusion, as mentioned in 3GPP TS36.300, the PCI information of a neighboring cell(s), which is sent by the X2 SETUP procedure, is important in order to implement the PCI Optimisation.

In contrast, in the existing 3GPP TS36.423, an eNB does not send information on what kind of SON solution each cell is performing. Further, in TS32.762 Ver10.3.0 (E-UTRAN Network Resource Model (NRM)), in an ExternalEUtranGenericCell, an ExternalENBFunction, and an EUtranRelation, information on what kind of SON solution a neighboring cell(s) is using to implement an SON use case (SON function) is not sent. Therefore, when the neighboring eNB receives an X2AP-message, the neighboring eNB has to transmit an X2AP-message to other eNBs at all times. As a result, the below-explained problem occurs in the PCI Optimisation.

An example of a PCI change operation in a case where a Distributed SON is used is explained hereinafter with reference to FIG. 18. Assume that an eNB 100 is performing a Distributed SON in a PCI assignment method. Assume also that the PCI value of a cell that is under the management of the eNB 100 is 3. As PCI Collision or PCI Confusion is detected, the PCI optimization function of the Distributed SON operates. When the PCI value is changed, for example, from 3 to 200, the eNB notifies neighboring eNBs 101, 102, 103, 104, 105 and 106 about the changed PCI value by transmitting an X2AP: X2 SETUP message or an X2 ENB CONFIGURATION UPDATE message to the neighboring eNBs. That is, in a case where the number of eNBs that manage cells adjacent to the cell of a given eNB is six as shown in FIG. 18, when the PCI of the cell managed by the eNB 100 is changed, the eNB sends an X2AP-message six times in total. Note that in this example, each eNB manages only one cell for the purpose of simplifying the explanation.

Further, to avoid the problem of PCI collision and PCI Confusion with cells adjacent to the neighboring cells, it is also necessary to send information on a change(s) relating to the neighboring cell information by the X2AP-procedure. Therefore, the eNBs 101, 102, 103, 104, 105 and 106 adjacent to the eNB 100 notify the neighboring eNBs that the PCI value of the cell under the management of the eNB 100 is changed from 3 to 200 by using an X2AP: X2 SETUP message or an X2 ENB CONFIGURATION UPDATE message.

FIG. 19 shows that the eNB 101 transmits an X2AP-message to eNBs 107, 108, 109, 106, 100 and 102, i.e., transmits an X2AP-message six times in total. Similarly, eNBs 102, 103, 104, 105 and 106 transmit an X2AP: X2 SETUP message or an X2 ENB CONFIGURATION UPDATE message to their neighboring eNBs.

The above-explained operation is an example of an operation for the Distributed SON according to the 3GPP standardization specifications TS36.423. As described above, in a case where the number of neighboring cells is six and the number of neighboring X2-links is also six, the number of X2AP-messages transmitted to send information about the change of one cell is 36 (6×6=36) messages.

In an actual operation, when macro-cells are adjacent to each other, the typical number of X2-links is 32. Therefore, the number of transmissions of X2AP-messages is 1024 (32×32=1024). That is, when a certain one of the PCIs is changed, X2AP-signalings occur 1024 times. Similarly, assuming a network in which in addition to macro-cells under the management of macro-base station, macro-cells having a small cell radius, pico-cells, and femto-cells exist in a mixed manner, the number of neighboring X2-links increases. For example, assuming the number of neighboring X2-links is 128, X2AP-signalings occur 16384 (128×128=16384) times. That is, when the PCI of only one cell is changed in an eNB, notifications of X2AP-signalings need to be performed "N_x2×N_x2=(square of N_x2)" times, where N_x2 is the number of X2-links. Because of the increase of the number of signaling messages as described above, there is a problem that congestion occurs in each node. Further, in a case where a PCI is sent as a result of the notification of an X2AP-message and PCI Confusion occurs in a neighboring neighboring eNB, when a PCI is further changed in the neighboring neighboring eNB, a PCI is further sent.

Although an example case where a PCI is changed is explained for this problem, similar problems also occur for the ECGI and the EARFCN, which are neighboring cell information.

As described above, since the Distributed SON having an SON function exists on the NE side, NEs notify each other about necessary change information through the X2-interface in a meshed pattern. As a result, there is a problem that the quantity of signals for X2AP-messages greatly increases. There is a possibility that: such a great increase in the quantity of the signals may cause a shortage of signal transmission buffers or signal reception buffers, make an eNB(s) unable to continue the normal operation, and cause an unstable state. Further, similarly, there is a possibility that as the number of signals increases, the processing performance may increase, thus making eNB(s) unable to continue the normal operation and causing an unstable state.

In contrast, in the case of the Centralised SON, the EM or the NM controls subordinate eNBs. Therefore, even when the PCI of a given eNB is changed, there is no need to send information about the PCI change, provided that the given eNB is also under the management of the same EM or the same NM, because the EM or the NM also manages the PCI change of that eNB. Therefore, the problem of the quantity of the signals greatly increasing due to the increase of X2AP-messages, which occurs in the Distributed SON, does not occur. However, in an actual operation, depending on the SON function algorithm implementation method of the apparatus (NE) vendor, there is a possibility that a Distributed SON and a Centralised SON exist in a mixed manner. For example, a Distributed SON and a Centralised SON existing in a mixed manner is explained with reference to FIG. 20.

Assume that eNBs 100, 102, 104, 108, 110 and 112 are controlled by an EM 200 and that the EM 200 has an SON function. Assume that a Distributed SON is performed for the other eNBs, i.e., the eNBs 101, 103, 105, 106, 107 and 109.

In the existing X2AP-messages, information about in which node a neighboring eNB(s) is implementing an SON function is not sent. Further, information about what kind of SON solution is used to implement an SON function is also not sent. For example, the eNB 106 that is implementing a Distributed SON does not recognize whether the eNB 100 is implementing a Distributed SON or implementing a Centralised SON. The eNB 106 is also not notified about the EM, the NM, or the like that is performing the SON function of the eNB 100.

When the PCI value of a cell under the management of the eNB 100 is changed from 3 to 200, the eNB 100 does not transmit an X2AP-message to the neighboring eNBs 104 and 102 because the eNBs 104 and 102 are controlled by the same EM 200 and they are implementing a Centralised SON. In contrast, the eNB 100 sends an X2AP-message to the eNBs 106, 101, 103 and 105 for the PCI change.

The eNBs 101, 103, 105 and 106, which have received the PCI change notification, do not recognize which SON function the neighboring eNBs are implementing and what kind of SON solution is used to implement the SON function. Therefore, as shown in FIG. 20, the eNB 101 notifies the eNBs 102, 106, 107, 108 and 109 about the PCI value change of the eNB 100, and the eNB 105 notifies the eNB 112 about the PCI value change of the eNB 100. Further, the eNB 106 notifies the eNB 110 about the PCI value change of the eNB 100.

In actuality, since the eNBs 108, 110 and 112 are controlled by the SON function of the same EM 200 as for the eNB 100, the notifications are unnecessary. That is, when the eNBs 108, 110 and 112 receive a notification about a PCI change through an X2A-message, they send it to the SON function disposed in the EM 200. However, the EM 200 has already recognized the PCI change itself of the eNB 100. Therefore, the signals sent to the eNBs 108, 110 and 112 are unnecessary signals.

As described above, when a Distributed SON and a Centralised SON exist in a mixed manner, signalings that are unnecessary for the nodes performing the Centralised SON occur because neighboring eNBs do not send the information about what kind of SON solution is implemented in which node to each other. Therefore, the advantage of the Centralised SON is significantly lost. In the above-shown example, the number of neighboring links is six at the maximum. However, assuming the number of X2-links is 128 for the neighboring eNBs, there is a possibility that unnecessary X2AP-signalings occur 128 times for one eNB. There is a possibility that the occurrences of such signalings in a large quantity cause a shortage of communication buffers and increase the number of signal processing processes, thus making the operation of the eNB(s) or the EM (or the NM) unstable and causing failures in the apparatuses. As described above, as the existing problem, there is a problem that since information about which node is implementing an SON function is not sent among neighboring eNBs in the X2P-procedure, an eNB(s) has to send a PCI change notification and the like by using an X2AP-message at all times.

A second problem is explained hereinafter. For example, although X2AP-messages such as an MRO (Mobility Robustness Optimisation) and an MLB (Mobility Load Balancing) are defined in 3GPP TS36.423 as shown in FIG. 21, it does not necessarily mean that all of neighboring eNBs support the same SON function(s). For example, a certain eNB can improve the handover success rate by optimizing the threshold and/or the parameter of the handover by using MRO (Mobility Robustness Optimisation). It should be noted that in the X2AP-procedure, it is possible to request the opposed eNB to change the handover threshold and/or a CIO (Cell individual offset) by using a Mobility Setting Change procedure.

Similarly, in the MLB (Mobility Load Balancing) procedure, the handover parameter and/or the CIO are changed based on load information (HW (hardware) load, TNL (transport network layer) load, and PRB (Physical resource block)) among eNBs so that the load is controlled among the eNBs. To make a change like this, in the X2AP-procedure, a notification is provided to the opposed eNB through the Mobility Setting Change procedure. Further, when Too Late Handover, Too Early Handover, and HO to Wrong Cell (TS36.300) are to be detected, a procedure such as a Radio Link Failure Indication and a Handover Event Report, which are X2AP-procedures, is used to recognize these phenomena. FIG. 21 shows an example of a correspondence relation between X2AP-procedures and SON use cases (SON functions).

However, when a plurality of vendor apparatuses exist in a mixed manner, all of neighboring eNBs do not necessarily support the same SON function(s). Therefore, there is a possibility that an eNB that supports the MRO starts a Radio Link Failure Indication, a Handover Event Report, or a Mobility State Change procedure for an eNB that does not support the MRO. Similarly, there is a possibility that it starts up a Resource Status Reporting Initiation or a Mobility Settings Change procedure for an eNB that does not support the MLB. Therefore, unnecessary X2AP-signalings occur in a large quantity, thus causing problems of the communication buffer shortage of an eNB(s) and an increase in the number of signal processing processes.

The present invention has been made to solve at least one of the above-described problems, and an object thereof is to provide a communication system, a base station apparatus, a data transmission method, and a program in which unnecessary signalings do not occur in large quantity as a result of the execution of a SON function.

Solution to Problem

A communication system according to a first aspect of the present invention includes: a first communication apparatus; and a second communication apparatus that performs data transmission/reception with the first communication apparatus, in which the first communication apparatus includes a transmission unit that transmits information to the second communication apparatus, the information being used to determine whether or not autonomous setting information should be transmitted from the second communication apparatus to the first communication apparatus.

A base station apparatus according to a second aspect of the present invention is a base station apparatus adjacent to a first base station apparatus, including a transmission unit that transmits information to the first communication apparatus, the information being used in the first base station apparatus to determine whether or not autonomous setting information should be transmitted to the base station apparatus.

A data transmission method according to a third aspect of the present invention is a data transmission method performed in a base station apparatus adjacent to a first base station apparatus, including transmitting information to the first communication apparatus, the information being used in the first base station apparatus to determine whether or not autonomous setting information should be transmitted to the base station apparatus.

A program according to a fourth aspect of the present invention is a program that causes a computer in a base station apparatus adjacent to a first base station apparatus to execute a step of transmitting information to the first communication apparatus, the information being used in the first base station apparatus to determine whether or not autonomous setting information should be transmitted to the base station apparatus.

Advantageous Effects of Invention

According to the present invention, it is possible to provide a communication system, a base station apparatus, a data transmission method, and a program in which unnecessary signalings do not occur in large quantity as a result of the execution of a SON function.

BRIEF DESCRIPTION OF DRAWINGS

FIG. 2 is a table showing information elements of an X2 SETUP REQUEST message according to the first exemplary embodiment;

FIG. 3 is a table showing information elements of an X2 SETUP RESPONSE message according to the first exemplary embodiment;

FIG. 4A is a table showing details of setting of SON Solution Information according to the first exemplary embodiment;

FIG. 4B is a table showing details of setting of SON Solution Information according to the first exemplary embodiment;

FIG. 5 is a table showing details of setting of Served Cell Information according to the first exemplary embodiment;

FIG. 6 is a table showing information elements of an ENB CONFIGURATION UPDATE message according to the first exemplary embodiment;

FIG. 7 is a sequence diagram showing a process for sending information about an SON function implementation method according to the first exemplary embodiment;

FIG. 9 is a table showing a configuration of a database unit according to the first exemplary embodiment;

FIG. 11 is a table showing information about an SON function of an eNB to be sent from an NM to an EM through a Type-2 interface according to a second exemplary embodiment;

FIG. 15 is a table showing information elements of an X2 SETUP RESPONSE message according to the third exemplary embodiment;

FIG. 20 is a diagram sowing a PCI change operation; and

FIG. 21 is a table showing an X2AP-message related to an SON function.

DESCRIPTION OF EMBODIMENTS

First Exemplary Embodiment

Figure 1:
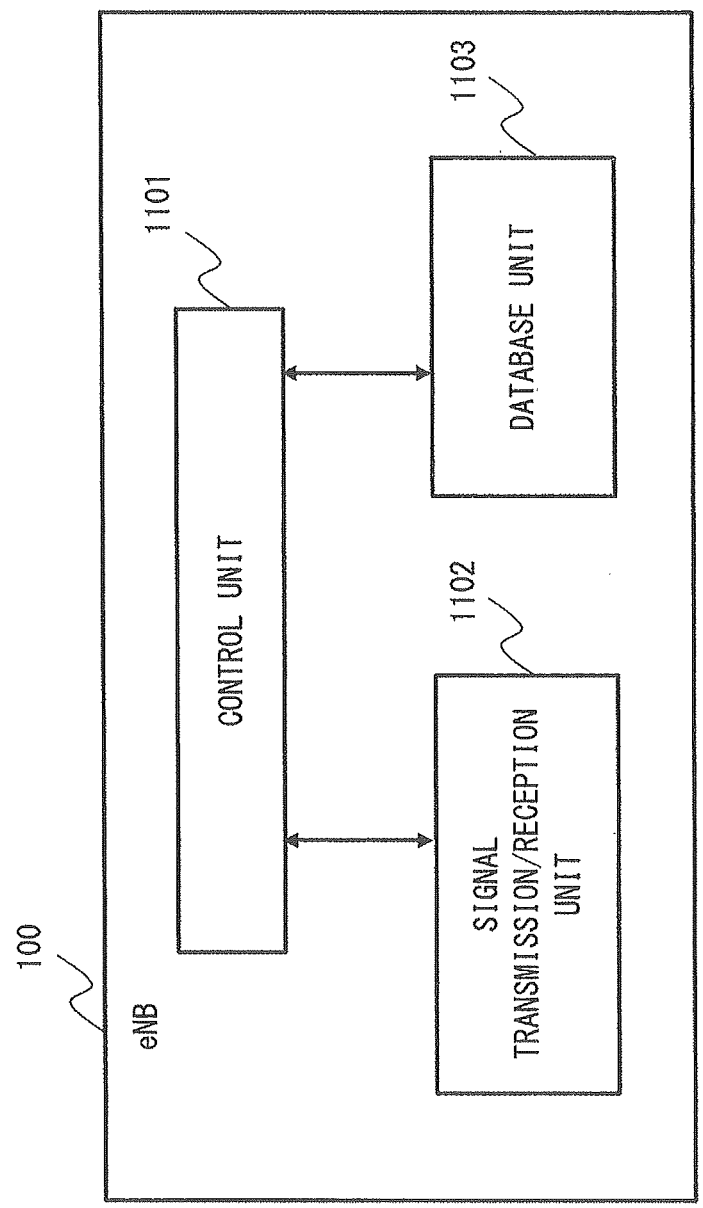
FIG. 1 is a configuration diagram of a base station apparatus according to a first exemplary embodiment.

Exemplary embodiments according to the present invention are explained hereinafter with reference to the drawings. A configuration example of a base station apparatus according to a first exemplary embodiment of the present invention is explained with reference to FIG. 1. Specifically, a configuration example of an eNB used as a base station in a 3GPP LTE radio communication scheme is explained. An eNB 100 includes a control unit 1101, a signal transmission/reception unit 1102, and a database unit 1103.

The signal transmission/reception unit 1102 performs the transmission/reception of signals with other eNBs, an MME, an EM and so on. Examples of the signals to be transmitted/received include an S1AP, an X2AP, a CORBA, an SOAP, an SNMP and so on. The S1AP is a signal that is transmitted/received between an eNB 100 and an MME. The X2AP is a signal that is transmitted/received between eNBs.

The signal transmission/reception unit 1102 transmits information about whether or not autonomous setting information should be transmitted from other eNBs to the eNB 100, to the other eNBs by using the X2AP. The autonomous setting information includes, for example, a PCI value, information that is transmitted at the time of execution of an MRO or an MLB, and so on. When a PCI value or the like is changed in a neighboring eNB and the eNB 100 is notified about the changed PCI value, the eNB 100 autonomously sets the PCI value of the neighboring eNB in the eNB 100 itself. Further, when the eNB 100 needs to change the PCI value of the eNB 100 itself as a result of the PCI value change setting in the neighboring eNB, for example, when PCI Confusion or the like could occur, the eNB 100 autonomously changes the PCI value of the eNB 100 itself. In the case where an SON function supported by the eNB itself or a Centralised SON is used, the information about whether or not autonomous setting information should be transmitted includes the EM that manages the eNB itself, the node identification information of the NM, or the like. The SON function is, for example, a function(s) mentioned in the SON use cases shown in FIG. 21.

Examples of the information that is transmitted from the signal transmission/reception unit 1102 of the eNB 100 to other eNBs include an X2 SETUP REQUEST message, an X2 SETUP RESPONSE message, an ENB CONFIGURATION UPDATE message, SON Solution Information, Served Cell Information and so on. Note that the X2 SETUP RESPONSE message is a response signal to the X2 SETUP REQUEST message.

Next, information elements that are set in the X2 SETUP REQUEST message and the X2 SETUP RESPONSE message are explained with reference to FIGS. 2 and 3. FIG. 2 shows an X2 SETUP REQUEST message. FIG. 3 shows an X2 SETUP RESPONSE message. As shown in FIGS. 2 and 3, an information element "SON Solution Information" is defined in the X2 SETUP REQUEST message and the X2 SETUP RESPONSE message.

FIGS. 4A and 4B show specific elements set in the SON Solution Information. In the SON Solution Information, functions to be executed in the SON (SON functions) are specified. For example, a PCI Assignment, an ANR (Automatic Neighbor Relation), an MRO (Mobility Robustness Optimization), an MLB (Mobility Load Balancing), a CCO (Coverage and Capacity Optimization), an Energy Serving, an ICIC (Inter-Cell Interference Coordination) and CoC are shown as SON functions. Further, in the SON Solution Information, information about which SON solution is used among a Centralised SON, a Hybrid SON, and a Distributed SON to implement each SON function is also shown. For example, in the SON Solution Information, when a Centralised SON or a Hybrid SON is to be used, "Centralised", "Hybrid" or the like is explicitly set. As for the SON functions for which "Centralised", "Hybrid" or the like is not explicitly set, they may be implemented by using a Distributed SON.

Further, for the SON functions that are to be executed by using a Centralised SON or a Hybrid SON, the node identification information of a higher-level apparatus that executes the SON function is also set. For the node identification information, a FQDN format, an IP address or the like may be used. The higher-level apparatus is an EM, an NM or the like.

Further, the SON Solution Information may be defined in an information element called "Served Cell Information" defined in the X2 SETUP REQUEST message and the X2 SETUP RESPONSE message instead of being defined in the X2 SETUP REQUEST message and the X2 SETUP RESPONSE message. FIG. 5 shows a setting example of the Served Cell Information in which SON Solution Information is added in its information element.

Further, the SON Solution Information may be defined in an ENB CONFIGURATION UPDATE message instead of being defined in the X2 SETUP REQUEST message and the X2 SETUP RESPONSE message. FIG. 6 shows an ENB CONFIGURATION UPDATE message in which SON Solution Information is added in its information elements.

Referring to FIG. 1 again, the control unit 1101 sets a parameter(s) relating to the SON function in the eNB 100. Further, in the case where the eNB 100 is implemented by using a Distributed SON, the SON function such as an ANR and a PCI Assignment is performed in the control unit 1101. That is, in the control unit 1101, an ANR algorithm, a PCI Assignment algorithm or the like is performed and an optimal parameter(s) for network design is autonomously set.

The database unit 1103 stores information about the SON of an eNB(s) adjacent to the eNB 100. For example, the database unit 1103 stores information on whether a neighboring eNB is using a Distributed SON or a Centralised SON. Further, the database unit 1103 stores information about the SON function(s) supported by a neighboring eNB(s) and so on.

Note that the function of each component of the eNB 100 may be implemented by using hardware, or may be implemented by using software that is accomplished by causing a CPU or the like to execute a program.

Further, each of the EM and the NM also has an apparatus configuration similar to that shown in FIG. 1. For example, the signal transmission/reception unit 1102 in the EM transmits a control message to an eNB through a Type-1 interface. Further, in the case of an EM-Centralised SON or a Hybrid SON in which the SON function is disposed in the EM, the SON function such as an ANR and a PCI Assignment is performed in the control unit 1101 in the EM.

Similarly, the signal transmission/reception unit 1102 in the NM transmits a control message to the EM through a Type-2 interface. Further, in the case of an NM-Centralised SON or a Hybrid SON in which the SON function is disposed in the NM, the SON function such as an ANR and a PCI Assignment is performed in the control unit 1101 in the NM.

Next, a notification sequence of an SON function implementation method by using SETUP REQUEST and X2 SETUP RESPONSE messages is explained with reference to FIG. 7.

Firstly, the control unit 1101 of the eNB 100 sets SON Solution Information in the eNB 100 (S11). In the case where the eNB 100 is using a Centralised SON solution, the SON Solution Information may be set by the EM or the NM. Next, the signal transmission/reception unit 1102 of the eNB 100 transmits the SON Solution Information in the eNB 100 to another eNB (eNB 101) by using an X2 SETUP REQUEST message (S12).

The eNB 101, which has received the X2 SETUP REQUEST message, stores the SON Solution Information of the eNB 100 in the database unit (S13). Further, the eNB 101 sets the SON Solution Information of the eNB 101 in the control unit (S14).

Next, the eNB 101 transmits the SON Solution Information in the eNB 101 to the eNB 100 by using an X2 SETUP RESPONSE message (S15). Upon receiving the X2 SETUP RESPONSE message, the eNB 100 stores the SON Solution Information of the eNB 101 in the database unit 1103.

Figure 8:
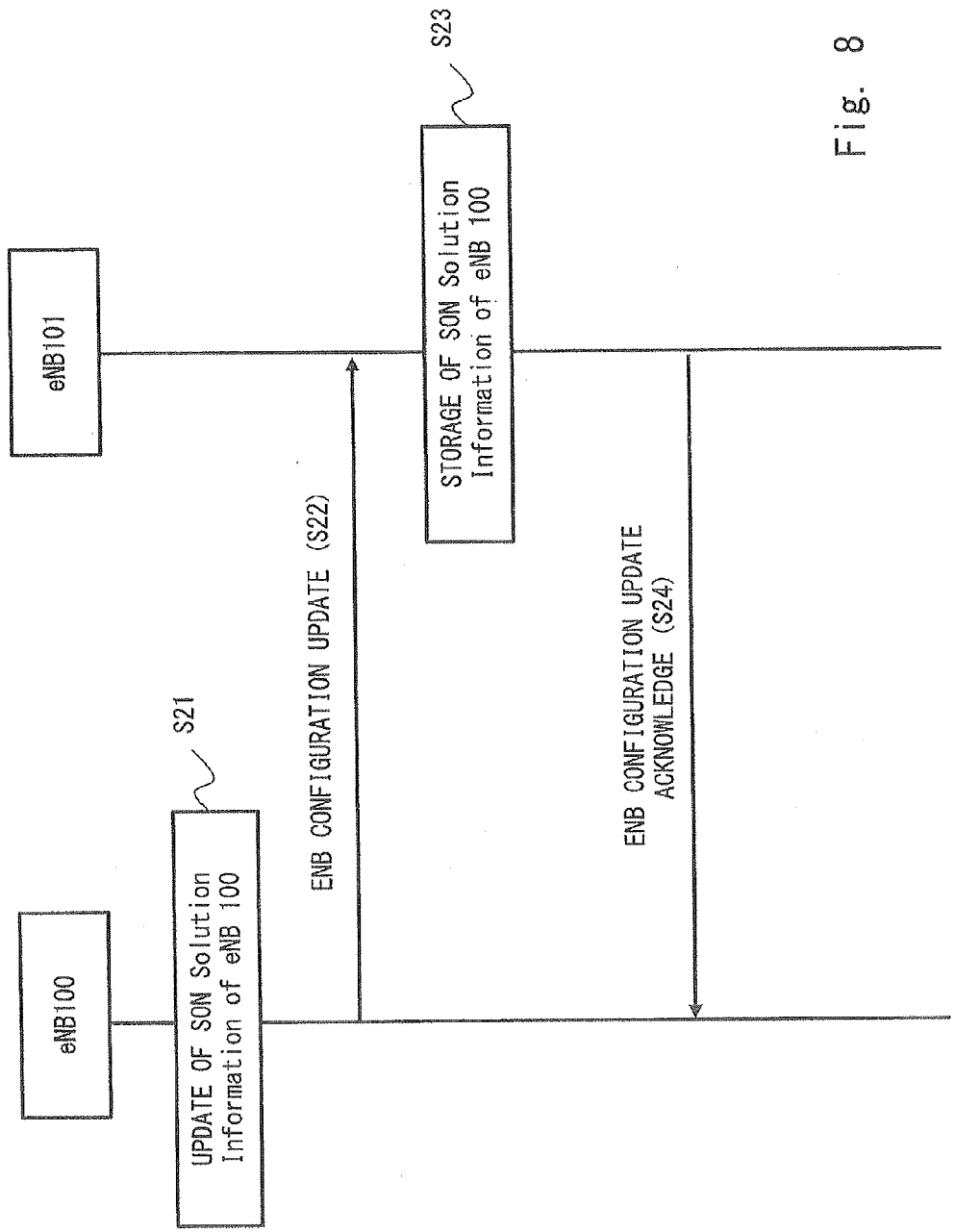
FIG. 8 is a sequence diagram showing a process for sending information about an SON function implementation method according to the first exemplary embodiment.

Next, a notification sequence of an SON function implementation method by using an ENB CONFIGURATION UPDATE message is explained with reference to FIG. 8. The ENB CONFIGURATION UPDATE message is sent when a change is made to the SON function implementation method in the eNB. For example, it is sent, when a Centralised SON is performed, when the EM that manages the eNB is changed, or when a new SON function is to be supported.

Firstly, the control unit 1101 of the eNB 100 updates SON Solution Information in the eNB 100 (S21). Next, the signal transmission/reception unit 1102 of the eNB 100 transmits the updated SON Solution Information of the eNB 100 to the eNB 101 by using an ENB CONFIGURATION UPDATE message (S22).

The eNB 101 overwrites the existing information with the updated SON Solution Information of the eNB 100 and thereby stores it in the database unit (S23). Alternatively, the eNB 101 replaces the existing information with the updated SON Solution Information and thereby stores the updated SON Solution Information in the database unit. Next, the eNB 101 sends back an ENB CONFIGURATION UPDATE ACKNOWLEDGE message to the eNB 100 as a response message to the ENB CONFIGURATION UPDATE message (S24). By receiving the CONFIGURATION UPDATE ACKNOWLEDGE message, the eNB 100 can recognize that the update information of the SON Solution Information of the eNB 100 has been properly reflected in the eNB 101.

Next, a configuration example of the database unit 1103 included in the eNB 100 is explained with reference to FIG. 9. FIG. 9 shows whether or not eNBs 101 to 106 adjacent to the eNB 100 support PCI optimization and MRO as SON functions. Further, FIG. 9 shows which of a Centralised SON, a Hybrid SON, and a Distributed SON is used in order to implement the PCI optimization and MRO. Further, FIG. 9 shows the node identifiers of nodes that perform an SON for the cases where a Centralised SON or a Hybrid SON is used.

For example, the eNB 101 supports the PCI optimization. The PCI optimization in the eNB 101 is performed by using a Distributed SON. In this way, since the node that performs the PCI optimization is the eNB 101 itself, "N/A", which indicates that no external node performing the SON exists, is set in the PCI optimization node identifier. Further, the eNB 101 supports the MRO. The MRO in the eNB 101 is performed by using a Hybrid SON, and the node performing the MRO is an EM 201.

Further, the eNB 102 supports the PCI optimization, but does not support the MRO. The PCI optimization is performed by using a Centralised SON, and the node performing the PCI optimization is an EM 200.

As described above, the database unit 1103 of the eNB 100 stores the SON function support status and the SON solution information for the neighboring eNB(s).

Next, an operation for sending information about an SON function between eNBs is explained. For example, the eNB 100 recognizes whether or not a neighboring eNB(s) has a PCI assignment optimization function based on whether or not an SON Solution type for a PCI Assignment parameter is set in the SON Solution Information. If the neighboring eNB holds a PCI assignment optimization function, the eNB 100 needs to notify the neighboring eNB about a PCI change by using an ENB CONFIGURATION UPDATE message when the PCI of the eNB 100 is changed. On the other hand, if the neighboring eNB does not hold a PCI assignment optimization function, the eNB 100 does not need to notify the neighboring eNB about a PCI change by using an ENB CONFIGURATION UPDATE message when the PCI of the eNB 100 is changed.

Further, the eNB 100 can recognize the presence/absence of MRO function support in the neighboring eNB based on whether or not an SON Solution type for MRO Algorithm parameter is set in the SON Solution Information. The eNB 100 needs neither to send information about a Handover Report procedure nor to start up a Mobility State Change procedure for an eNB(s) that does not support the MRO. In the example in FIG. 9, since eNBs 102 and 105 do not support the MRO function, the eNB 100 does not send information about the Handover Report procedure and the Mobility State Change procedure necessary for the MRO operation to the eNBs 102 and 105. As a result, it is possible to reduce the number of the X2AP-messages.

Similarly, the eNB 100 can recognize the presence/absence of ANR function support in the neighboring eNB based on whether or not an SON Solution type for ANR Algorithm parameter is set in the SON Solution Information, recognize the presence/absence of MLB function support in the neighboring eNB based on whether or not an SON Solution type for MLB Algorithm parameter is set in the SON Solution Information, recognize the presence/absence of CCO function support in the neighboring eNB based on whether or not an SON Solution type for CCO Algorithm parameter is set in the SON Solution Information, recognize the presence/absence of Energy Saving function support in the neighboring eNB based on whether or not an SON Solution type for an Energy Saving Algorithm parameter is set in the SON Solution Information, recognize the presence/absence of ICIC function support in the neighboring eNB based on whether or not an SON Solution type for ICIC Algorithm parameter is set in the SON Solution Information, and recognize the presence/absence of CoC function support in the neighboring eNB based on whether or not an SON Solution type for CoC Algorithm parameter is set in the SON Solution Information.

By sending information about the presence/absence of SON function support to each other among neighboring eNBs in advance as described above, it is possible to prevent change information for an SON function that is not supported in the neighboring eNB(s) and the like from being transmitted. As a result, it is possible to reduce the number of useless control messages and the like.

Further, as shown in FIGS. 4A and 4B, when an SON Solution type parameter exists and the SON solution is a Centralised SON or a Hybrid SON, the node identifier information of the node that is implementing that SON function can be set in the SON Solution Information. In FIGS. 4A and 4B, an IP-address or a host name (FQDN format) is set as the node identifier information. However, the node identifier information is not limited to the IP-address and the host name (FQDN format). That is, any identifiers or any numbering system can be used, provided that they are uniquely identified in the network.

For example, in the example in FIG. 20, by the Identification of Node executing PCI Assignment algorithm of the SON Solution Information, when an X2-link is established with a neighboring eNB, the eNBs 100, 102, 104, 112, 110 and 108 can send information that the PCI assignment optimization functions of the eNBs 100, 102, 104, 112, 110 and 108 are implemented by the EM 200 by using an X2 SETUP message. Therefore, when the PCI value of the cell of the eNB 100 is changed from 3 to 200, the eNB 100 sends an X2AP-message to the eNBs 106, 101, 103 and 105. Since the eNB 110 recognizes the fact that the PCI assignment optimization function is implemented by the EM 200, the eNB 106 does not send the X2AP-message to the eNB 110.

Similarly, the eNB 105 can determine not to notify the eNB 112 about the signal, and the eNB 101 can determine not to notify the eNBs 108 and 102 about the signal. Therefore, eventually, the eNB 101 does not notify the eNBs 102 and 208 about the X2AP signaling in which the PCI assignment optimization is implemented by the same EM 200 as that for the eNB 100. That is, the eNB 101 needs to notify only the eNBs 106, 107 and 109 about the X2AP signaling. Therefore, it is possible to reduce the number of X2AP-messages transmitted between eNBs.

Similarly, Identification of Node executing ANR algorithm is node identifier information of the node that is implementing an ANR function. Identification of Node executing MRO algorithm is node identifier information of the node that is implementing an MRO function. Identification of Node executing MLB algorithm is node identifier information of the node that is implementing an MLB function. Identification of Node executing CCO algorithm is node identifier information of the node that is implementing a CCO function. Identification of Node executing Energy Saving algorithm is node identifier information of the node that is implementing an Energy Saving function. Identification of Node executing ICIC algorithm is node identifier information of the node that is implementing an ICIC function. Further, Identification of Node executing CoC algorithm is node identifier information of the node that is implementing a CoC function.

By sending node identification information of the EM or the like that is implementing a respective SON function between eNBs in this manner, it is possible to reduce the number of X2AP-messages as described above.

Figure 10:
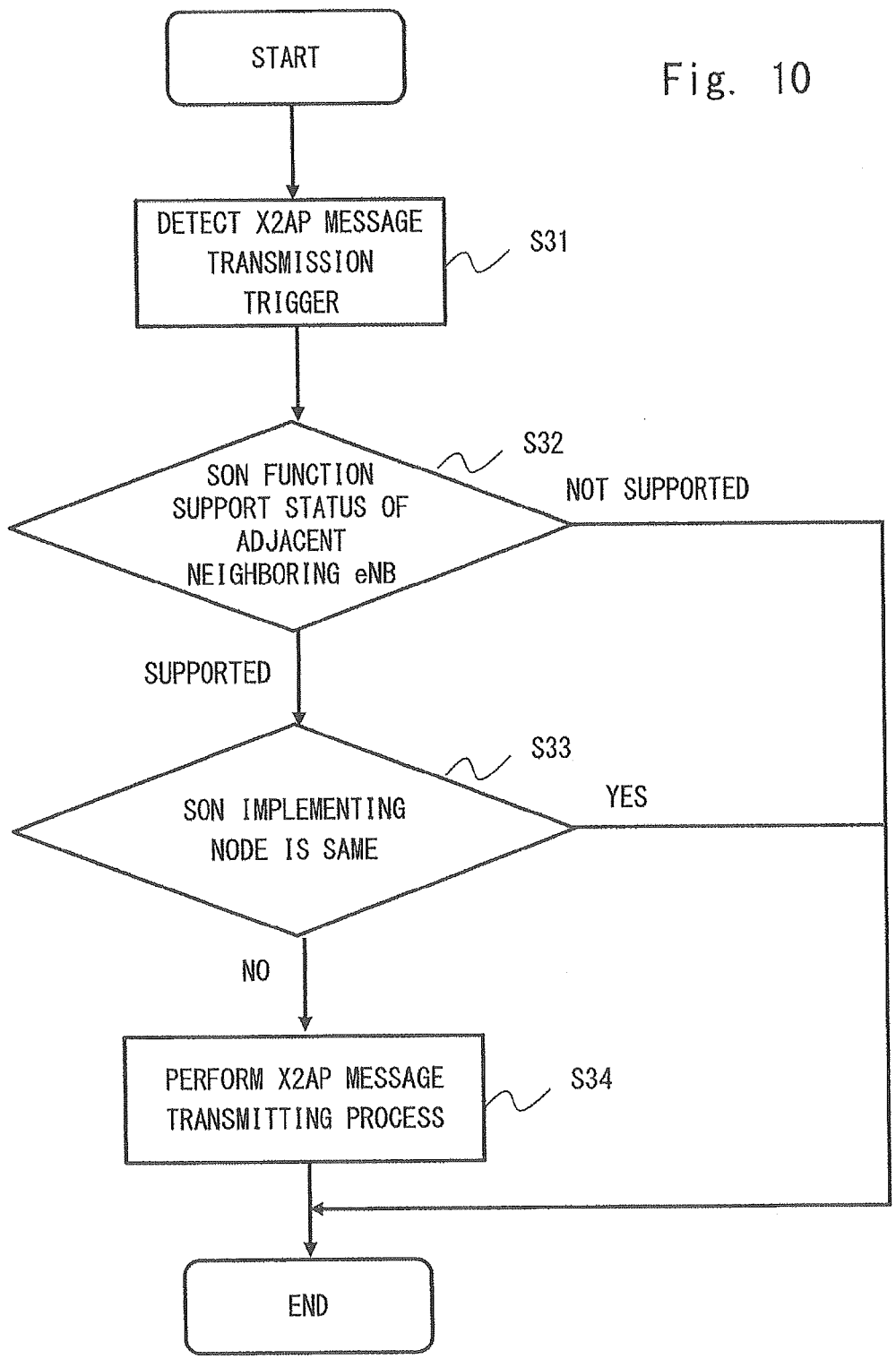
FIG. 10 is a flowchart showing an X2AP-message transmitting process in an eNB according to the first exemplary embodiment.

Next, an X2AP-message transmitting process flow in an eNB according to the first exemplary embodiment of the present invention is explained with reference to FIG. 10. Firstly, the eNB 100 performs measurement control necessary for an SON algorithm, detects a trigger for X2AP-message transmission for the purpose of sending a parameter(s) determined in the SON algorithm, and so on (S31). For example, when the eNB 100 has changed the PCI value in the eNB 100 itself, the eNB 100 detects a trigger for X2AP-message transmission.

Next, the control unit 1101 of the eNB 100 acquires information about what kind of SON function is supported by a neighboring eNB(s) from the database unit 1403 (S32). For example, when the neighboring eNB does not support any SON function relating to the PCI optimization, the control unit 1101 determines not to transmit the X2AP-message relating to the PCI value change to the neighboring eNB. When the neighboring eNB supports the SON function relating to the PCI optimization, the control unit 1101 determines whether or not the node that is implementing the SON function is the same as its own node (S33). That is, when the node that is implementing the SON function in the eNB 100 is the EM 200, the control unit 1101 determines whether or not the node that is implementing the SON function in the neighboring eNB is the EM 200. When the node that is implementing the SON function in the neighboring eNB is the same as its own node, the signal transmission/reception unit 1102 does not transmit the X2AP-message to the neighboring eNB. When the node that is implementing the SON function in the neighboring eNB is different from its own node, the signal transmission/reception unit 1102 transmits the X2AP-message to the neighboring eNB (S34).

An operation in the eNB 101 adjacent to the eNB 100 is explained hereinafter. When the eNB 101 is notified that the PCI value has been changed in the eNB 100, the eNB 101 performs the processes in the steps S31 to S33. When it is determined that the node implementing the SON function in the neighboring eNB is different from its own node in the step S33, the eNB 101 may further determine whether or not the node implementing the SON function in the neighboring eNB is the same as that for the eNB 100. When the node implementing the SON function in the neighboring eNB is the same as that for the eNB 100, the eNB 101 may not transmit the X2AP-message to the neighboring eNB. Further, when the node implementing the SON function in the neighboring eNB is different from that for the eNB 100, the eNB 101 may transmit the X2AP-message to the neighboring eNB.

As explained above, by using the communication system according to the first exemplary embodiment of the present invention, advantageous effects explained below can be achieved.

As a first advantageous effect, since an eNB(s) sends information about the support status of an SON function when an X2 link is established, an eNB(s) can recognize the support status of the SON function in the neighboring eNB. Therefore, the eNB(s) can prevent an X2AP-message from being transmitted to the eNB(s) that does not support the SON function. As a result, the eNB(s) can reduce the number of X2AP-message transmissions.

As a second advantageous effect, since an eNB(s) sends information about the identifier of a node that is implementing an SON function when an X2 link is established, an eNB(s) can recognize what kind of SON solution is used to implement the SON of a neighboring eNB(s) and which node is implementing the SON function. Therefore, the eNB(s) can determine the need for transmitting an X2AP-message by comparing the node identifiers. As a result, it is possible to reduce the number of X2AP-message transmissions.

Further, in the case where a Relay node (RN) and a Donor eNB (DeNB) exist as shown in 3GPP TS36.300, the communication method according to the first exemplary embodiment of the present invention can be applied even to an X2-interface between an RN and a DeNB and between an RN and another RN. As a result, it is possible to reduce the number of X2AP-signalings between the RN and the DeNB and between the RN and the RN.

Further, the first exemplary embodiment has been explained by using eNBs in accordance with the LTE. However, the invention according to the first exemplary embodiment can also be applied to 3G systems in accordance with the W-CDMA. Further, the invention according to the first exemplary embodiment can also be applied to other wireless access systems in accordance with GERAN, Wimax, WLAN and so on. For example, in the case where an RNC has an SON function as shown in 3GPP TS25.401, it is possible to reduce the number of the signalings necessary for the SON such as an RNSAP signal between RNCs by sending information about the support status of an SON function, the node identifier of a node implementing an SON function, or the solution type of an SON function in an Iur-interface between RNCs.

Further, it is conceivable to perform an SON function such as MRO and ICIC even between femto-base stations (HeNBs, HNBs), eNBs, or RNCs. That is, it is possible to send information such as the support status of an SON function, an SON solution type, and the node identifier of a node implementing an SON function to each other between an HeNB and an HeNB, between an HeNB and an eNB, between an HeNB and an RNC, between an HeNB and an HNB, between an HNB and an HNB, between an HNB and an eNB, between an HNB and an RNC, and so on. As a result, it is possible to reduce the number of unnecessary signalings related to the SON between femto-base stations or between a femto-base station and a macro-base station.

Second Exemplary Embodiment

In the first exemplary embodiment, a method for sending information about a supported SON function, an SON solution and so on by using an X2AP-message between eNBs is explained. However, it is conceivable that no X2-link is established between eNBs because of topographic reasons such as the presence of a mountain range between eNBs, or for the reduction of CAPEX/OPEX by the reduction of the X2-link band. In such cases, if there is an interface between NMs, between EMs, or between an NM and an EM in an OAM system, information about how an SON function is implemented may be sent by using that interface.

FIG. 11 is a table showing information about the SON function of an eNB to be sent from an NM to an EM through a Type-2 interface between the NM and the EM. The information shown in FIG. 11 corresponds to, for example, a case where the SON Solution Information defined in FIG. 4 is added in an EUtranRelation defined in GPP TS32.762 in which specifications relating to wireless access networks are specified. In this way, the EM or the eNB can recognize the SON function support status in a neighboring eNB(s), as well as the SON solution type and the node identifier of the node implementing the SON function. The identifier may be a DN (Distinguished name), an IP-address, an FQDN, or other forms of identifiers. That is, the identifier may be any information that makes it possible to uniquely identify nodes within the network.

As a result, similarly to the first exemplary embodiment, it is possible to omit the transmission of an S1AP message for the purpose of the SON through a CN (Core Network) to an eNB(s) that does not support the SON function and/or to an eNB(s) for which the SON implementing node is the same. Note that the method for adding SON Solution Information is not limited to the configuration shown in FIG. 4. That is, any configuration capable of sending information about the SON support status in a neighboring eNB(s), a solution type, and the node identifier of a node implementing an SON can be used.

Figure 12:
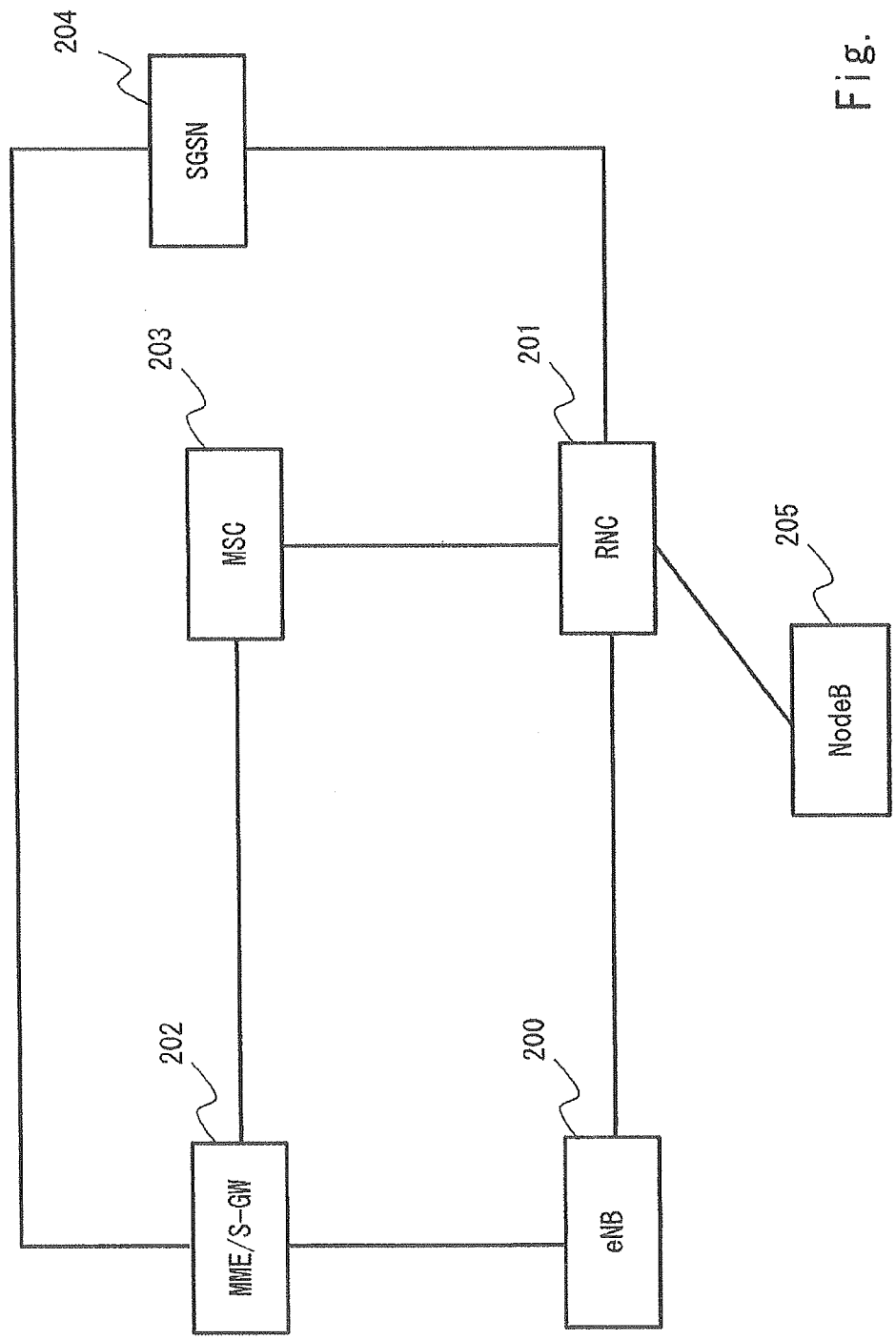
FIG. 12 is a configuration diagram of a communication system according to the second exemplary embodiment.

Further, the SON function notification method and the like can also be applied to connection between systems having different wireless accesses, i.e., to an Inter-RAT (Radio Access Technology) scenario. An SON function such as an ANR function and an MRO function can also be applied to connection between different RATs, e.g., to connection between an E-UTRAN using an LTE wireless access technique and a UTRAN using a W-CDMA wireless access technique. For example, by using an ANR function, an eNB in accordance with the LTE can automatically configure neighboring cell information in the network. In such a case, as shown in FIG. 12, it is also possible to directly connect an eNB 200 with an RNC 201 between a UTRAN system and an E-UTRAN system and to send neighboring cell information to each other. The E-UTRAN system includes an eNB 200 and an MME/S-GW 202. The UTRAN system includes an RNC 201, an MSC 203, and a NodeB 205 An SGSN 204 is used as a gateway apparatus that connects the UTRAN with the E-UTRAN. The present invention can be applied even to this case. That is, information on an SON function support status, an SON solution type, and the identifier information of an SON implementing node can be reciprocally sent between the eNB 200 and the RNC 201. As a result, it is possible to reduce the number of unnecessary signalings related to the SON between RATs.

Further, it is also possible to reciprocally send information on an SON function support status, an SON solution type, and the node identifier of an SON implementing node through a core network (MME, MSC, SGSN and so on) between an eNB and an RNC according to an S1AP protocol or an RANAP protocol. As a result, it is possible to reduce the number of unnecessary signalings related to the SON between RATs.

Third Exemplary Embodiment

A purpose of the first and second exemplary embodiments according to the present invention is to reduce the number of unnecessary X2AP-messages by sending information on an SON function implementing node, an SON function support status, and so on. In a third exemplary embodiment according to the present invention, an eNB does not directly send information on the SON function implementing node, the SON function support status, and so on, but instead specifies an X2AP-message(s) for which the reception is undesired among X2AP-messages transmitted from a neighboring eNB and sends its information in advance when an X2AP with the neighboring eNB is established.

Figure 13:
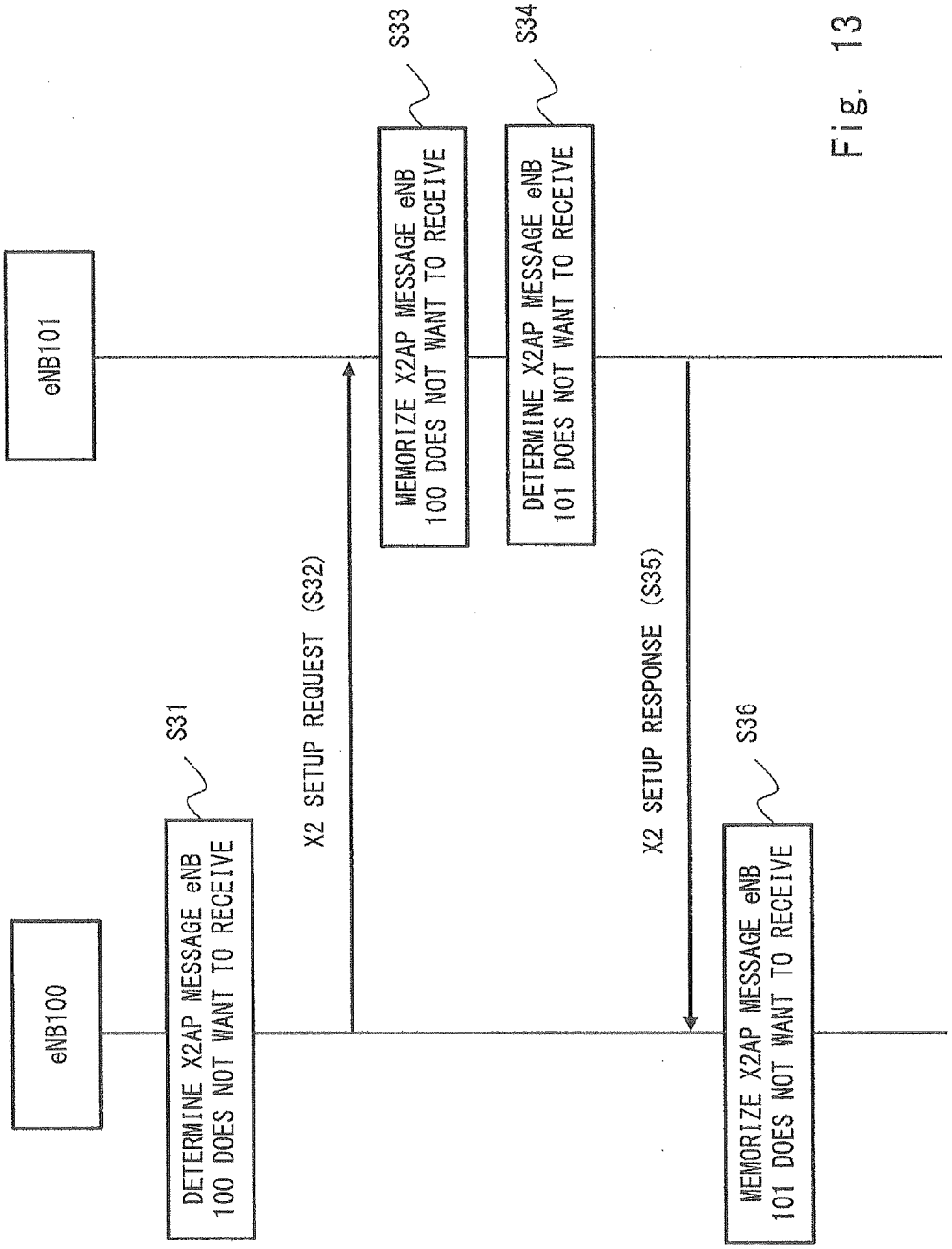
FIG. 13 is a sequence diagram showing an X2AP establishing process according to a third exemplary embodiment.

An X2AP establishing process flow is explained with reference to FIG. 13. Firstly, a transmission source eNB determines an X2AP-message(s) for which the reception from the neighboring eNB is undesired (S31). Next, the transmission source eNB transmits the determined information by using an X2 SETUP REQUEST message (S32). FIG. 15 shows an example of an X2 SETUP message. In FIG. 15, it is possible to set a Prohibited X2AP-procedure parameter group, which is the information about an X2AP-message(s) for which the reception is undesired, in the X2 SETUP REQUEST message. For example, by setting as "Load Indication", the transmission source eNB indicates that the eNB does not want to receive a Load Indication procedure.

An eNB, which has received the X2 SETUP REQUEST message, memorizes the information of the X2AP-message that the transmission source eNB does not want to receive (S33). Further, it performs control so that the neighboring eNB that has transmitted this eNB does not start the specified X2AP-procedure. Next, the eNB, which has received the X2 SETUP REQUEST message, determines an X2AP-message(s) for which the reception is undesired (S34) and sends the X2AP-message(s) of which the reception is undesired by using an X2AP SETUP RESPONSE (S36).

Figure 14:
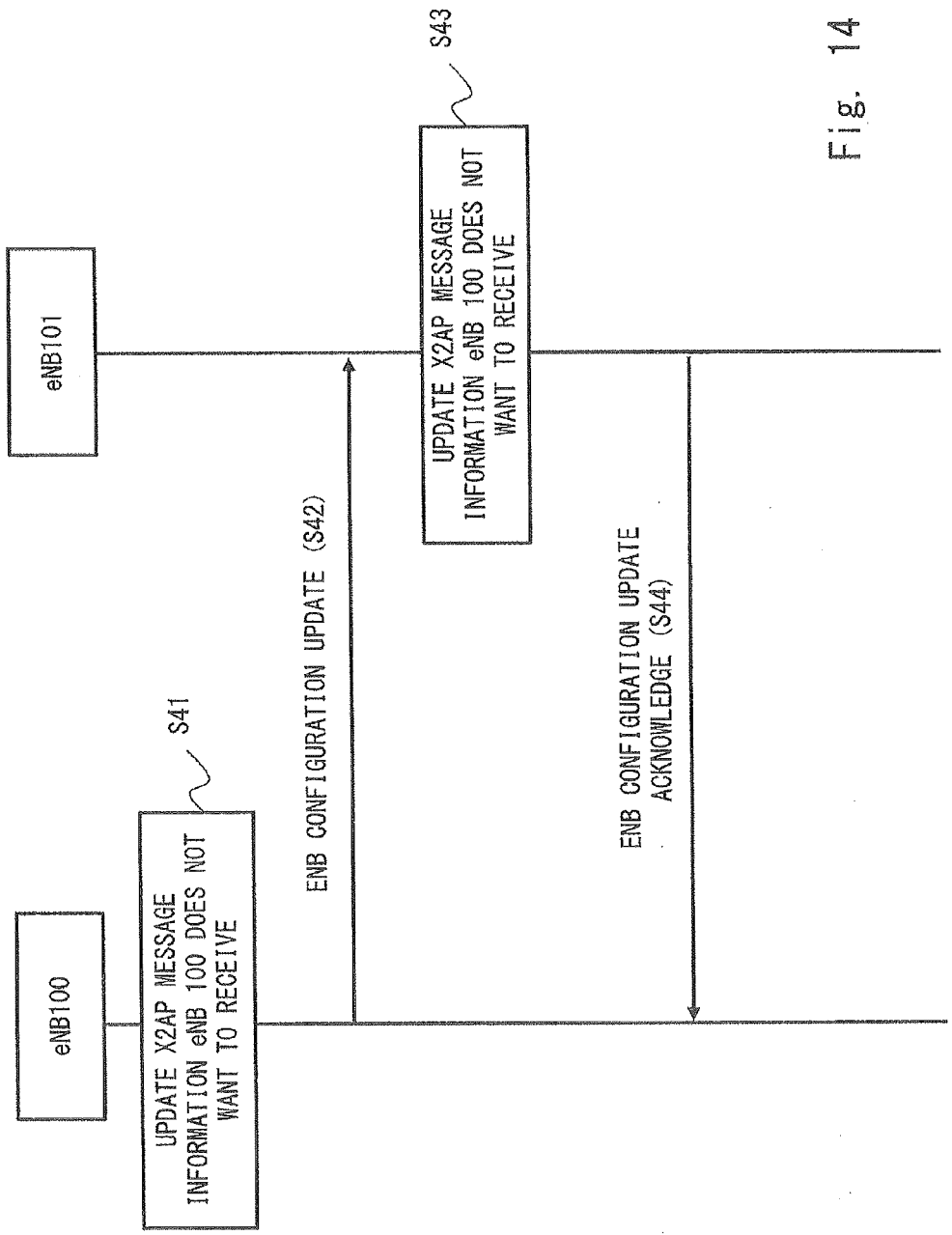
FIG. 14 is a sequence diagram showing an X2AP establishing process according to the third exemplary embodiment.
Figure 16:
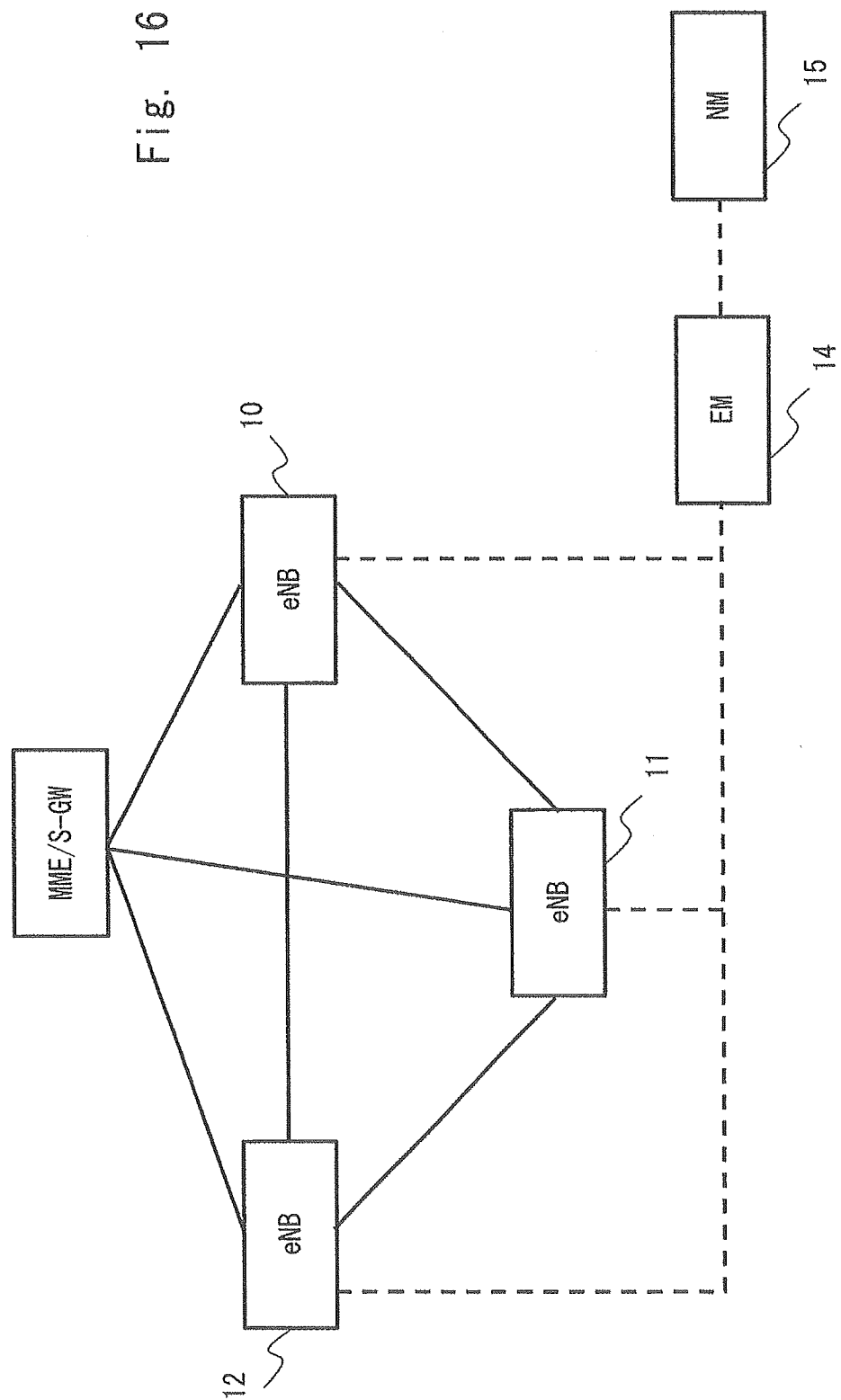
FIG. 16 is a configuration diagram of a mobile communication system compliant with an LTE radio communication scheme.
Figure 17:
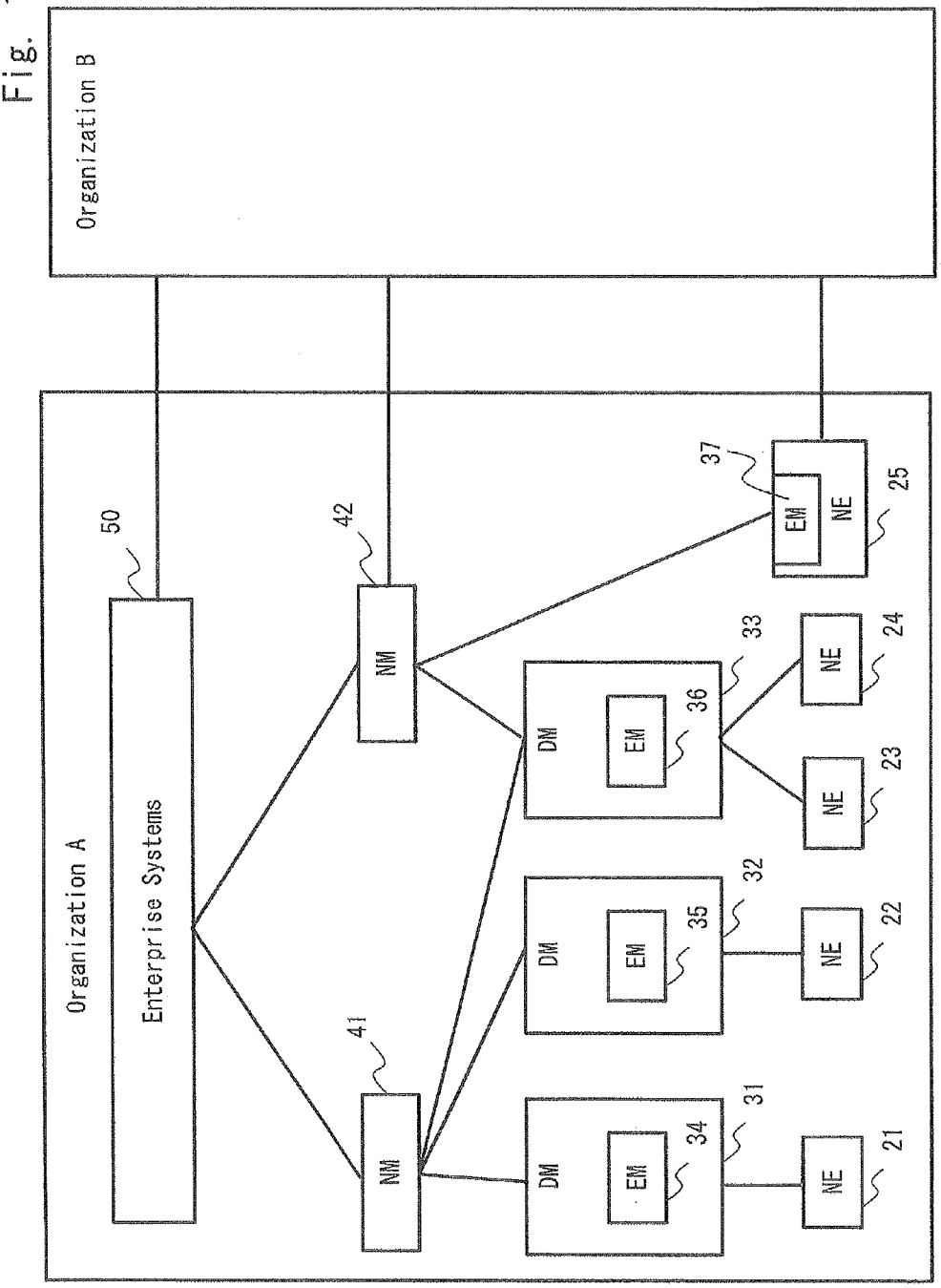
FIG. 17 is a diagram showing an OAM reference model.
Figure 18:
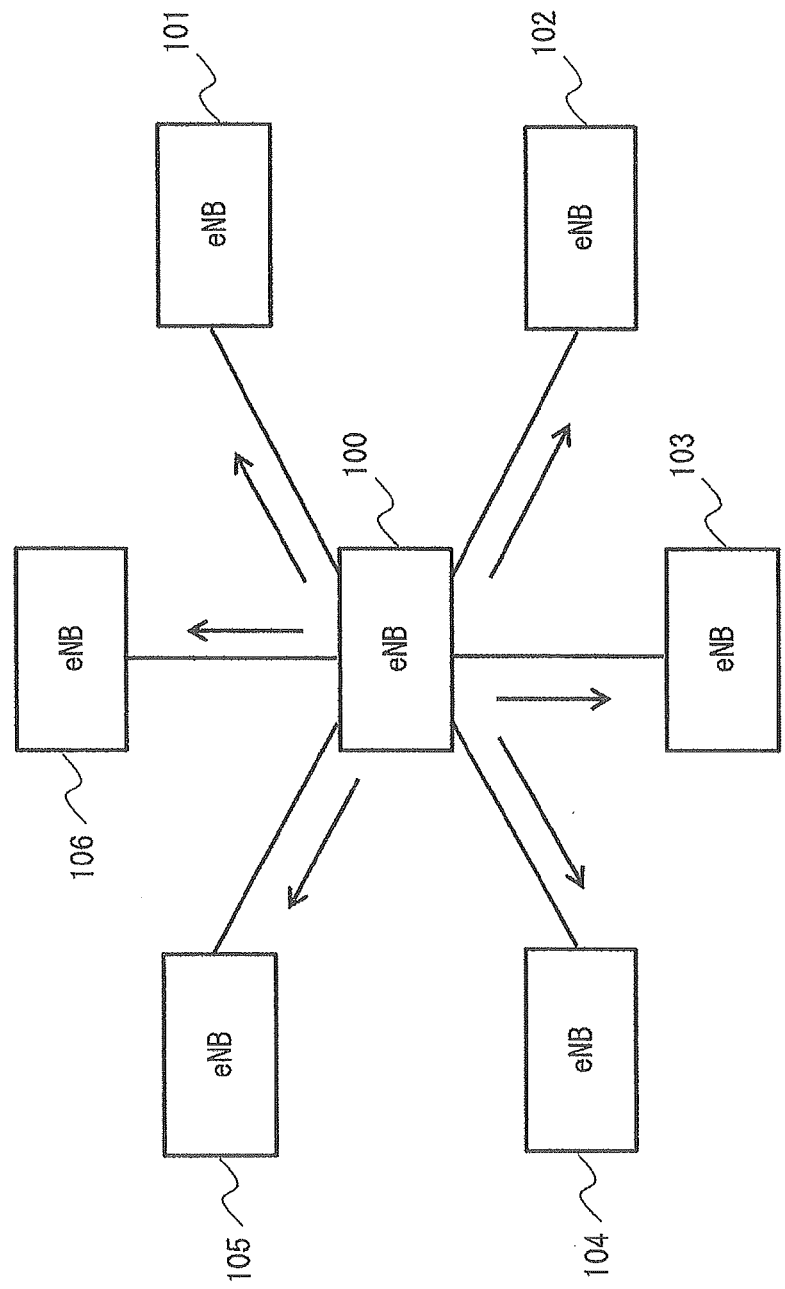
FIG. 18 is a diagram sowing a PCI change operation.
Figure 19:
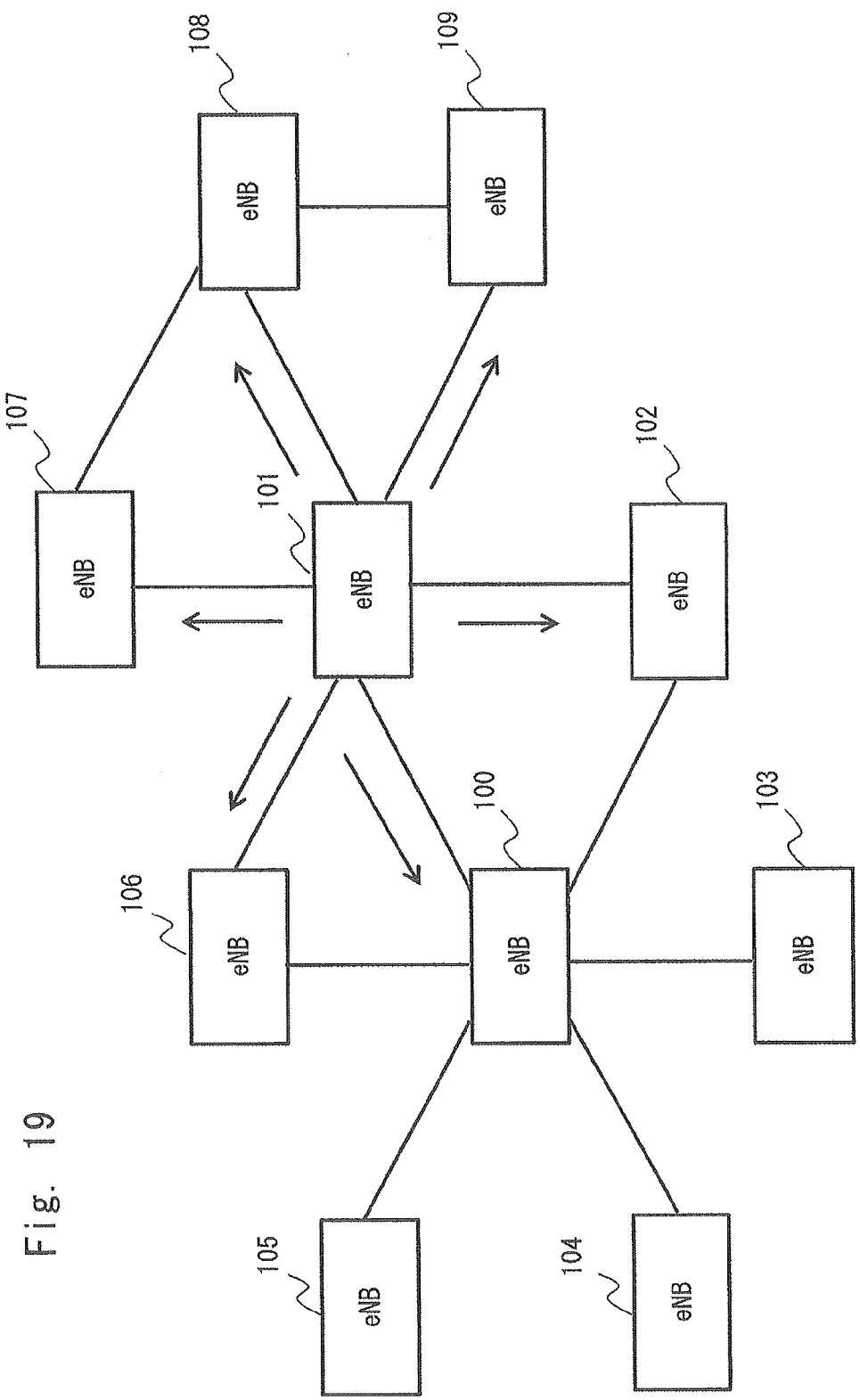
FIG. 19 is a diagram sowing a PCI change operation.

Further, when a change is made to the Prohibited X2AP-procedure parameter group, as shown in FIG. 14, firstly, the information of the X2AP-message for which the reception is undesired is updated in the eNB 100. The eNB 100 sets the changed Prohibited X2AP-procedure parameter group, which is the information of the X2AP-message for which the reception is undesired, by using ENB CONFIGURATION UPDATE, and sends its information to the neighboring eNB (S42).

Next, the eNB 101 updates the X2AP-procedure that the eNB 100 does not want to receive (S43). As a result, the eNB can recognize the X2AP-message that the neighboring eNB does not want to receive in advance, thus achieving an advantageous effect of reducing unnecessary the number of X2AP-messages. Needless to say, the Prohibited X2AP-procedure parameter, which is the information of the X2AP-message for which the reception is undesired, may be added in other messages or other parameters. Further, the Prohibited X2AP-procedure is not limited to the configuration shown in FIG. 15, provided that it can send information on what kind of X2AP-procedure is undesired to be received. Next, the eNB 101 transmits ENB CONFIGURATION UPDATE ACKNOWLEDGE to the eNB 100 as a response signal to the ENB CONFIGURATION UPDATE (S44).

As explained above, by using the communication system according to the third exemplary embodiment of the present invention, it is possible to notify a neighboring eNB(s) about information about an X2AP-message(s) of which the transmission is unnecessary when an X2-link is established. As a result, it is possible to prevent unnecessary X2AP-messages from being transmitted, thus making it possible to reduce the number of the X2AP-message transmissions.

Note that the present invention is not limited to the above-described exemplary embodiments, and various modifications can be made without departing from the scope and spirit of the present invention.

For example, although the present invention is described as a hardware configuration in the above-described exemplary embodiments, the present invention is not limited to the hardware configurations. The processes of an eNB(s) shown in FIGS. 7, 8, 10, 13 and 14 can be implemented by causing a CPU (Central Processing Unit) to execute a computer program. In such a case, the computer program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent application No. 2011-251454, filed on Nov. 17, 2011, the disclosure of which is incorporated herein in its entirety by reference.

REFERENCE SIGNS LIST 100, 101, 200 eNB
201 RNC
202 MME/S-GW
203 MSC
204 SGSN
205 NodeB
1101 CONTROL UNIT
1102 SIGNAL TRANSMISSION/RECEPTION UNIT
1103 DATABASE UNIT

The invention claimed is:

1. A communication system, comprising:
a first communication apparatus; and
a second communication apparatus that performs data transmission/reception with the first communication apparatus,
wherein the first communication apparatus comprises a transmission unit that transmits information to the second communication apparatus, the information being used to determine whether or not autonomous setting information should be transmitted from the second communication apparatus to the first communication apparatus,
wherein, when the autonomous setting information of the first communication apparatus is managed in a higher-level apparatus, the first communication apparatus transmits node identifier information of the higher-level apparatus to the second communication apparatus, and
wherein, when the autonomous setting information is changed in the first communication apparatus, the first communication apparatus transmits the changed autonomous setting information to a communication apparatus including, among another communication apparatus adjacent to the first communication apparatus, a communication apparatus of which the autonomous setting information is managed in a higher-level apparatus different from the higher-level apparatus managing the autonomous setting information of the first communication apparatus.

2. The communication system according to claim 1, wherein the first and second communication apparatuses comprise base station apparatuses used in a mobile communication system, and the autonomous setting information is transmitted by using a communication message defined between the base station apparatuses.

3. The communication system according to claim 1, wherein the autonomous setting information includes information about a plurality of SON (Self Organizing Networks) functions, and
wherein the first communication apparatus notifies the second communication apparatus about an SON function supported in the first communication apparatus among the plurality of SON functions.

4. The communication system according to claim 3, wherein the second communication apparatus transmits information about an SON function that is supported in the first communication apparatus to the first communication apparatus and does not transmit information about an SON function that is not supported in the first communication apparatus to the first communication apparatus.

5. The communication system according to claim 1, wherein the autonomous setting information includes information about a plurality of SON Self Organizing Networks) functions, and
wherein the first communication apparatus transmits, among information about the plurality of SON functions, information about an SON function of which transmission from the second communication apparatus is undesired to the second communication apparatus.

6. The communication system according to claim 5, wherein the second communication apparatus does not transmit information about an SON function for which it is notified that transmission from the first communication apparatus is undesired, to the first communication apparatus.

7. The communication system according to claim 1, wherein the plurality of SON functions includes at least one of a PCI (Physical Cell ID) Assignment, an ANR (Automatic Neighbor Relation), MRO (Mobility Robustness Optimization), MLB (Mobility Load Balancing), CCO (Coverage and Capacity Optimization), Energy Saving, ICIC (Inter-cell Interference Coordination), and CoC (Cell outage Compensation).

8. A base station apparatus adjacent to a first base station apparatus, the base station apparatus comprising:
a transmission unit that transmits information to the first base station apparatus, the information being used in the first base station apparatus to determine whether or not autonomous setting information should be transmitted to the base station apparatus,
wherein, when the autonomous setting information of the base station apparatus is managed in a higher-level apparatus, the transmission unit transmits node identifier information of the higher-level apparatus to the first base station apparatus, and
wherein, when the autonomous setting information is changed in the base station apparatus, the base station apparatus transmits the changed autonomous setting information to a communication apparatus including, among another communication apparatus adjacent to the base station apparatus, a communication apparatus of which the autonomous setting information is managed in a higher-level apparatus different from the higher-level apparatus managing the autonomous setting information of the base station apparatus.

9. A data transmission method performed in a base station apparatus adjacent to a first base station apparatus, the data transmission method comprising:
transmitting information to the first base station apparatus, the information being used in the first base station apparatus to determine whether or not autonomous setting information should be transmitted to the base station apparatus; and
when the autonomous setting information of the base station apparatus is managed in a higher-level apparatus, transmitting node identifier information of the higher-level apparatus to the first base station apparatus,
wherein, when the autonomous setting information is changed in the base station apparatus, the base station apparatus transmits the changed autonomous setting information to a communication apparatus including, among another communication apparatus adjacent to the base station apparatus, a communication apparatus of which the autonomous setting information is managed in a higher-level apparatus different from the higher-level apparatus managing the autonomous setting information of the base station apparatus.

10. A non-transitory computer readable media storing a program that causes a computer in a base station apparatus adjacent to a first base station apparatus to execute:
transmitting information to the first base station apparatus, the information being used in the first base station apparatus to determine whether or not autonomous setting information should be transmitted to the base station apparatus; and
when the autonomous setting information of the base station is managed in a higher-level apparatus, transmitting node identifier information of the higher-level apparatus to the first base station,
wherein, when the autonomous setting information is changed in the base station apparatus, the base station apparatus transmits the changed autonomous setting information to a communication apparatus including, among another communication apparatus adjacent to the base station apparatus, a communication apparatus of which the autonomous setting information is managed in a higher-level apparatus different from the higher-level apparatus managing the autonomous setting information of the base station apparatus.

11. The communication system according to claim 1, wherein, when the autonomous setting information is changed in the first communication apparatus, the first communication apparatus transmits the changed autonomous setting information to the communication apparatus including, among said another communication apparatus adjacent to the first communication apparatus, a communication apparatus of which the autonomous setting information is not managed in any higher-level apparatus.

12. The communication system according to claim 1, further comprising a third communication apparatus that receives the changed autonomous setting information from the first communication apparatus.

13. The communication system according to claim 12, wherein the third communication apparatus transmits the changed autonomous setting information to a communication apparatus including, among another communication apparatus adjacent to the third communication apparatus, at least one of a communication apparatus of which the autonomous setting information is managed in a higher-level apparatus different from the higher-level apparatus managing the autonomous setting information of the first communication apparatus and a communication apparatus to which the autonomous setting information is not transmitted from any higher-level apparatus.

14. The communication system according to claim 12, wherein the third communication apparatus transmits the changed autonomous setting information to a communication apparatus including, among another communication apparatus adjacent to the third communication apparatus, a communication apparatus of which the autonomous setting information is managed in a higher-level apparatus different from the higher-level apparatus managing the autonomous setting information of the first communication apparatus and a communication apparatus to which the autonomous setting information is not transmitted from any higher-level apparatus.

15. The base station apparatus according to claim 8, wherein, when the autonomous setting information is changed in the base station apparatus, the base station apparatus transmits the changed autonomous setting information to the communication apparatus including, among said another communication apparatus adjacent to the base station apparatus, a communication apparatus of which the autonomous setting information is not managed in any higher-level apparatus.

* * * * *